(12) United States Patent
Luo et al.

(10) Patent No.: US 11,882,600 B2
(45) Date of Patent: Jan. 23, 2024

(54) CONDITIONAL UPLINK GRANT IN UNLICENSED SPECTRUM

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Basking Ridge, NJ (US); Tao Luo, San Diego, CA (US); Naeem Akl, Somerville, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/352,138

(22) Filed: Jun. 18, 2021

(65) Prior Publication Data

US 2022/0408484 A1  Dec. 22, 2022

(51) Int. Cl.
| H04W 74/08 | (2009.01) |
| H04W 74/00 | (2009.01) |
| H04W 72/02 | (2009.01) |
| H04W 72/04 | (2023.01) |
| H04W 72/0453 | (2023.01) |
| H04W 72/0446 | (2023.01) |
| H04W 72/044 | (2023.01) |
| H04W 72/23 | (2023.01) |

(52) U.S. Cl.
CPC ....... *H04W 74/0816* (2013.01); *H04W 72/02* (2013.01); *H04W 72/046* (2013.01); *H04W 72/0446* (2013.01); *H04W 72/0453* (2013.01); *H04W 72/23* (2023.01); *H04W 74/008* (2013.01)

(58) Field of Classification Search
CPC .... H04B 7/0695; H04W 16/14; H04W 72/02; H04W 72/0446; H04W 72/0453; H04W 72/23; H04W 72/046; H04W 74/008; H04W 74/0808; H04W 74/0816; H04W 74/004; H04W 74/006
See application file for complete search history.

(56) References Cited

U.S. PATENT DOCUMENTS

| 2019/0230706 A1* | 7/2019 | Li ........................ H04B 7/088 |
| 2021/0211908 A1* | 7/2021 | Jiang ..................... H04L 5/0051 |
| 2021/0282188 A1* | 9/2021 | Cui ................... H04W 74/0816 |
| 2023/0085934 A1* | 3/2023 | Schober .................... H04L 5/14 |
| 2023/0189260 A1* | 6/2023 | Bae .......................... H04L 5/00 370/329 |

* cited by examiner

*Primary Examiner* — Awet Haile
(74) *Attorney, Agent, or Firm* — Patterson + Sheridan, LLP

(57) ABSTRACT

Certain aspects of the present disclosure provide techniques for channel access in an unlicensed spectrum. An example method of wireless communication by a user equipment includes receiving a resource grant indicating a plurality of resource candidates for an uplink signal. The method also includes sensing for energy, in response to the resource grant, over one or more of the resource candidates in a first sensing occasion before a transmission occasion of the uplink signal. The method further includes transmitting, during the transmission occasion, the uplink signal using a subset of the resource candidates selected based at least in part on energy sensed in the first sensing occasion.

27 Claims, 15 Drawing Sheets

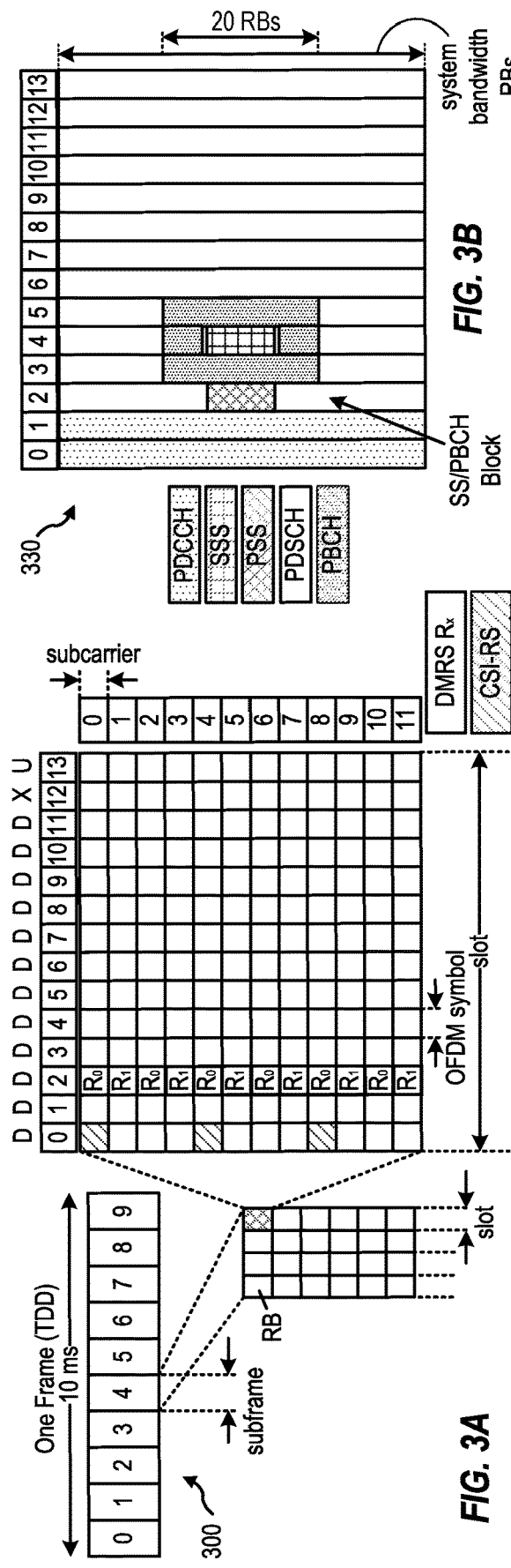
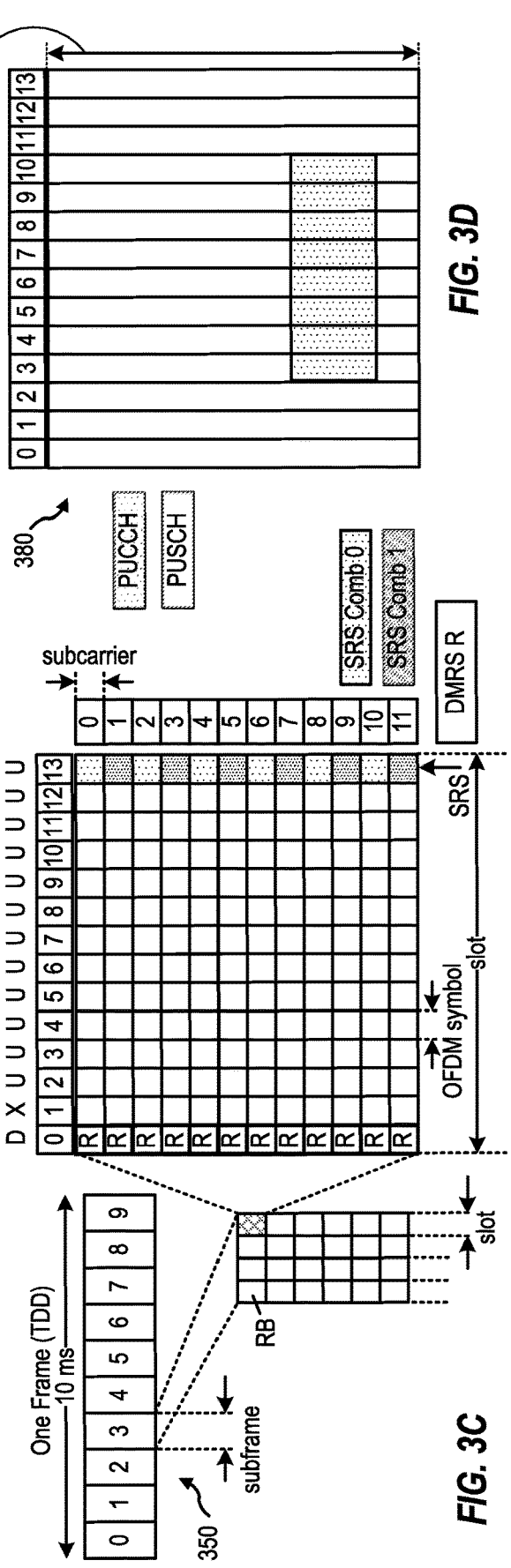

CONDITIONAL UPLINK GRANT IN UNLICENSED SPECTRUM

INTRODUCTION

Aspects of the present disclosure relate to wireless communications, and more particularly, to techniques for channel access in an unlicensed spectrum.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE). The method generally includes receiving a resource grant indicating a plurality of resource candidates for an uplink signal. The method also includes sensing for energy, in response to the resource grant, over one or more of the resource candidates in a first sensing occasion before a transmission occasion of the uplink signal. The method further includes transmitting, during the transmission occasion, the uplink signal using a subset of the resource candidates selected based at least in part on energy sensed in the first sensing occasion.

In certain aspects, the method may further include sensing for energy over the subset of the resource candidates in a second sensing occasion between the first sensing occasion and the transmission occasion of the uplink signal in time. Transmitting the uplink signal may comprise transmitting the uplink signal if energy sensed in the second sensing occasion is less than or equal to a threshold. The subset of the resource candidates may be selected based on the subset of the resource candidates having energy sensed in the first sensing occasion that is less than or equal to a threshold.

One aspect provides a method for wireless communication by a network entity. The method generally includes transmitting, to a UE, a resource grant indicating a plurality of resource candidates for an uplink signal and a first sensing occasion. The method also includes refraining from transmitting using resources included in the resource candidates during the first sensing occasion. The method further includes receiving, from the UE, the uplink signal using a subset of the resource candidates.

One aspect provides an apparatus for wireless communication. The apparatus generally includes a memory and a processor. The processor is coupled to the memory, and the processor and the memory are configured to receive a resource grant indicating a plurality of resource candidates for an uplink signal, sense for energy, in response to the resource grant, over one or more of the resource candidates in a first sensing occasion before a transmission occasion of the uplink signal, and transmit, during the transmission occasion, the uplink signal using a subset of the resource candidates selected based at least in part on energy sensed in the first sensing occasion.

One aspect provides an apparatus for wireless communication. The apparatus generally includes a memory and a processor. The processor is coupled to the memory, and the processor and the memory are configured to transmit, to a UE, a resource grant indicating a plurality of resource candidates for an uplink signal and a first sensing occasion, refrain from transmitting using resources included in the resource candidates during the first sensing occasion, and receive, from the UE, the uplink signal using a subset of the resource candidates.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
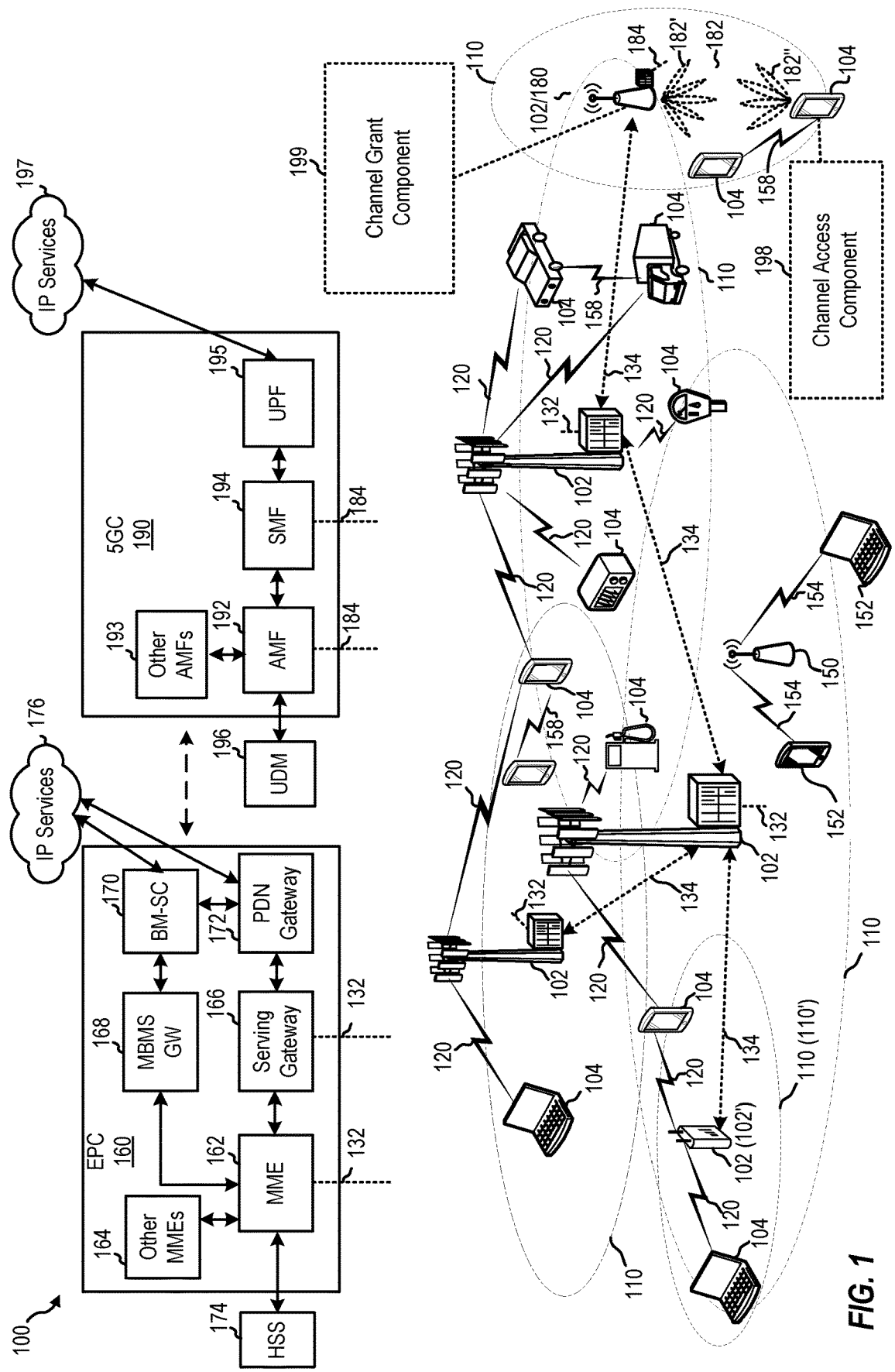
FIG. 1 is a block diagram conceptually illustrating an example wireless communication network.

Aspects of the present disclosure provide apparatuses, methods, processing systems, and computer-readable mediums for a conditional uplink grant providing resource candidates, for example, in an unlicensed spectrum. An unlicensed spectrum refers to any frequency band(s) that are not subject to licensed use under regulatory practice, such that the frequency band(s) are open to use by any devices, and not just devices that have a license to use the particular frequency band(s).

Channel access and/or resource reservations (for example, in unlicensed spectrums/bands) may depend on sensing of a channel to identify if that channel is idle (e.g., unoccupied by other wireless communication devices such as wireless wide area network (WWAN) and/or wireless local area network (WLAN) devices). Such a channel access scheme may be referred to as a listen-before-talk (LBT) procedure. For uplink (UL) transmissions, the channel access scheme may use an "all-or-nothing" mechanism. That is, the UE can only transmit if all the LBT channels overlapping with the UL resource allocation are considered idle. For example, a UE may be scheduled to transmit over a plurality of frequency channels (referred to herein as LBT channels), and perform a LBT procedure by measuring or sensing energy on each of the plurality of frequency channels prior to transmitting on the plurality of frequency channels. If the energy sensed on a particular frequency channel is below a threshold (e.g., an energy detection threshold, which may be region specific or a default value), the channel is considered idle. If the energy sensed on the particular frequency channel is above the threshold, the channel is busy.

Channel idleness conditions may change during the scheduling gap between a resource grant that schedules the uplink transmission by indicating a particular time (e.g., and frequency) for the uplink transmission and the scheduled uplink transmission itself. For example, if any one of the LBT channels is detected as being busy during the scheduling gap, a user equipment (UE) will cancel the uplink transmission, under an "all-or-nothing" channel access procedure.

Aspects of the present disclosure provide apparatus and techniques for uplink channel access using a conditional uplink grant. Such a grant may provide resource candidates (e.g., corresponding to different time, frequency, and/or spatial resources) from which the UE selects based on energy sensed in an LBT sensing occasion. In certain cases, the UE may perform a two-step channel access procedure. The UE may sense for energy over the resource candidates in a first sensing occasion and then sense for energy over a subset of the resource candidates in a second sensing occasion, where the subset of the resource candidates were identified as being idle based on the energy sensed in the first sensing occasion. In certain cases, the UE may sense for energy over the resource candidates in a single sensing occasion and transmit the scheduled uplink signal based on the energy sensed in the sensing occasion, for example, for spatial and/or time domain candidates. In certain cases, the UE may sense for energy in multiple sensing occasions within a sensing window until the channel is detected as being idle or the time runs out in the sensing window.

The channel access procedures described herein may reduce the cancellation of an uplink transmission due to LBT failure. For example, the channel access procedures enable the UE to use a subset of the resources allocated for the uplink transmission, which avoids cancellation under an all-or-nothing LBT scheme. The channel access procedures also enable the UE to perform the selection of resources using channel sensing results more recent than conventional approaches, for example, in the initial sensing occasion for a two-step channel access procedure or in a later sensing occasion that is prior to the scheduled uplink transmission. In a two-step channel access procedure, the idleness states of channel(s) sensed in the first sensing occasion may have a high likelihood of remaining idle in the second sensing occasion, for example, due to the short duration between the first and second sensing occasions. The channel access procedures described herein may provide desirable spectral efficiencies and/or desirable uplink performance, for example, due to the reduced cancellation of the uplink transmission.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes channel grant component 199, which may be configured to transmit, to a UE, a resource grant indicating resource candidates for an uplink signal; refrain from transmitting using the resource candidates in a sensing occasion; and receive, from the UE, the uplink signal using a subset of the resource candidates. Wireless network 100 further includes channel access component198, which may be configured to receive the resource grant indicating the resource candidates for the uplink signal; sense for energy over the resource candidates in the sensing occasion; and transmit the uplink signal using a subset of the resource candidates selected based at least in part on the energy sensed in the sensing occasion.

Figure 2:
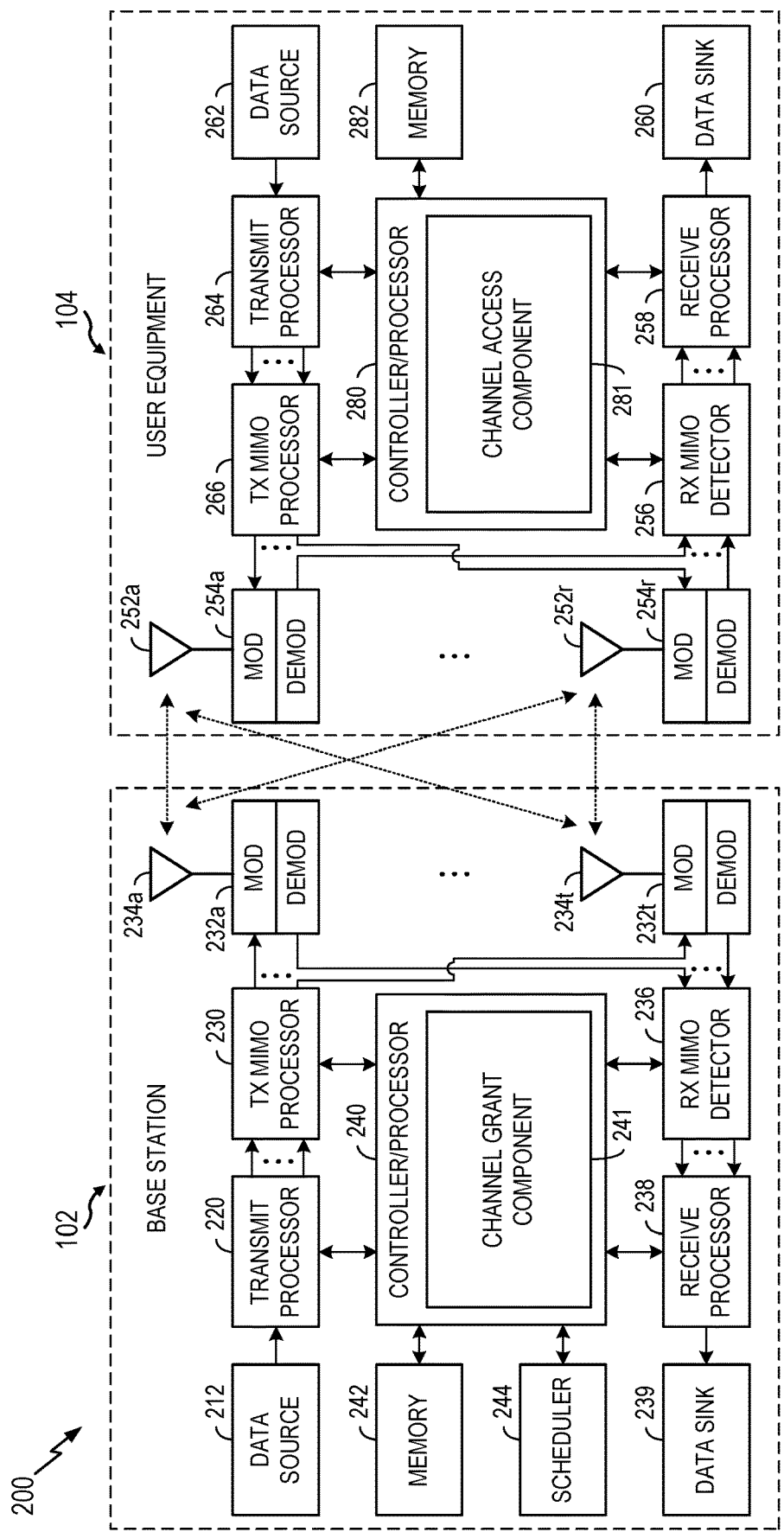
FIG. 2 is a block diagram conceptually illustrating aspects of an example a base station and a user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes channel grant component 241, which may be representative of channel grant component 199 of FIG. 1. Notably, while depicted as an aspect of controller/processor 240, channel grant component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes channel access component 281, which may be representative of channel access component 198 of FIG. 1. Notably, while depicted as an aspect of controller/processor 280, channel access component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of downlink (DL) channels within a 5G subframe, FIG. 3C is a diagram 350 illustrating an example of a second subframe within a 5G frame structure, and FIG. 3D is a diagram 380 illustrating an example of uplink (UL) channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 0 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, certain wireless networks may support communications in unlicensed mmWave bands, and the channel access schemes described herein may be employed for such unlicensed mmWave bands.

Introduction to Channel Access Procedures for Unlicensed Spectrum Communications According to aspects of the present disclosure, channel access and/or resource reservations may depend on sensing of a channel to identify if that channel is idle using an LBT procedure, as discussed. NR communications that involve communications in an unlicensed spectrum may be referred to NRU.

In certain cases, load-based LBT may be implemented using a random duration (e.g., Type 1 uplink channel access) or a fixed duration (e.g., Type 2 channel access) for sensing channel idleness. In Type 1 uplink channel access, the time duration spanned by the sensing occasion(s) that are sensed to be idle before an uplink transmission(s) is random. Type 1 may involve a random count down procedure based on a contention window.

Figure 4A:
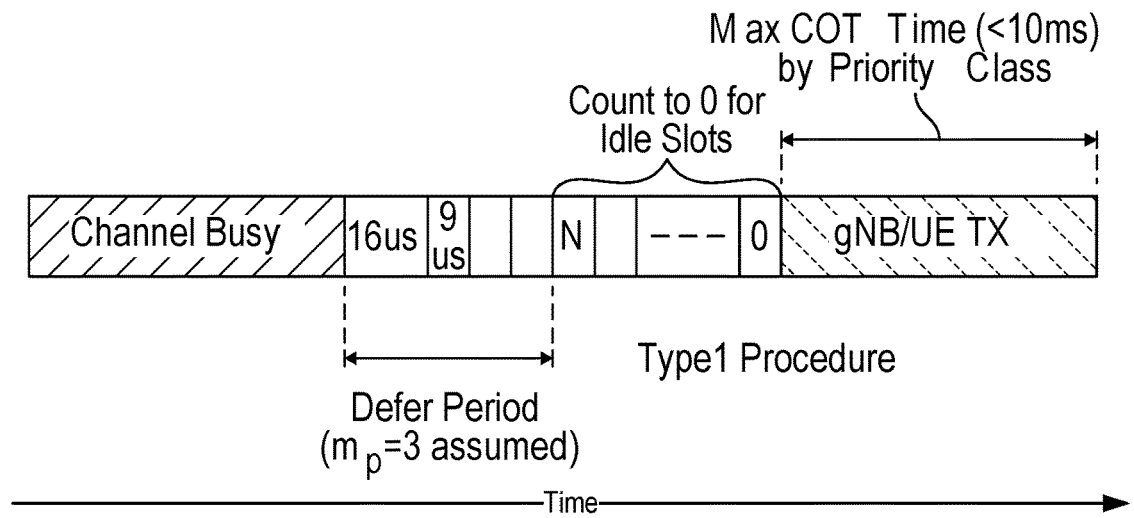
FIGS. 4A-4C are timing diagrams illustrating various examples of channel access procedures for wireless communications in an unlicensed spectrum.

FIG. 4A is a timing diagram illustrating an example of a random sensing occasion for channel access, in accordance with certain aspects of the present disclosure. In this example, the channel may be busy for a certain duration, and after a defer period, a UE may sense the channel in a sensing occasion having a random duration (e.g., a random number of N sensing slots). The UE may decrement a counter of the N sensing slots and sense the channel until either a busy sensing slot is detected or all the sensing slots of the sensing occasion are detected to be idle.

In Type 2 uplink channel access, the time duration spanned by the sensing occasion(s) that are sensed to be idle before an uplink transmission(s) is deterministic. Type 2 may provide fixed sensing intervals (e.g., 25 microseconds (µs) or 16 µs) with certain gap constraints within a sensing occasion. There may be different sub-types within Type 2 with separate fixed duration for sensing intervals (e.g., sensing occasion) or no sensing interval, such as Type 2A with a sensing interval of 25 µs, Type 2B with a sensing interval of 16 µs, and Type 2C with no sensing interval (e.g., the UE does not sense the channel before the transmission).

Figure 4B:
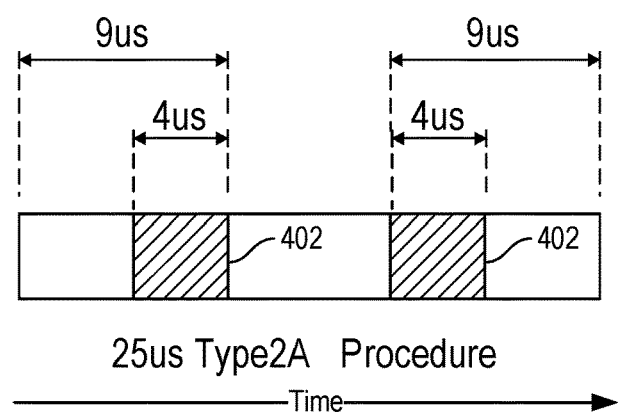

FIG. 4B is a timing diagram illustrating an example sensing occasion having a duration of 25 µs for Type 2A channel access. In this example, the channel may be considered to be idle if for both sensing slots 402 (which may have the same or different durations as depicted in FIG. 4B) are sensed to be idle within the sensing occasion.

Figure 4C:
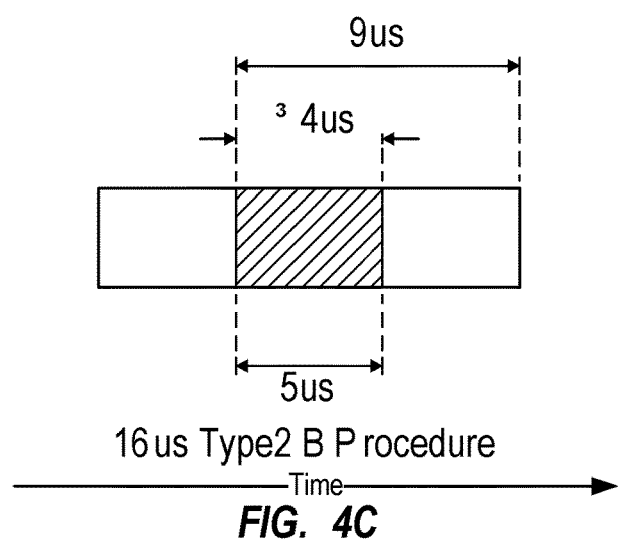

FIG. 4C is a timing diagram illustrating an example sensing occasion having a duration of 16 µs for Type 2B channel access. In this example, the channel may be considered to be idle within the sensing occasion if the channel is sensed to be idle for total of at least 5 µs with at least 4 µs of sensing occurring in the sensing slot.

Figure 5:
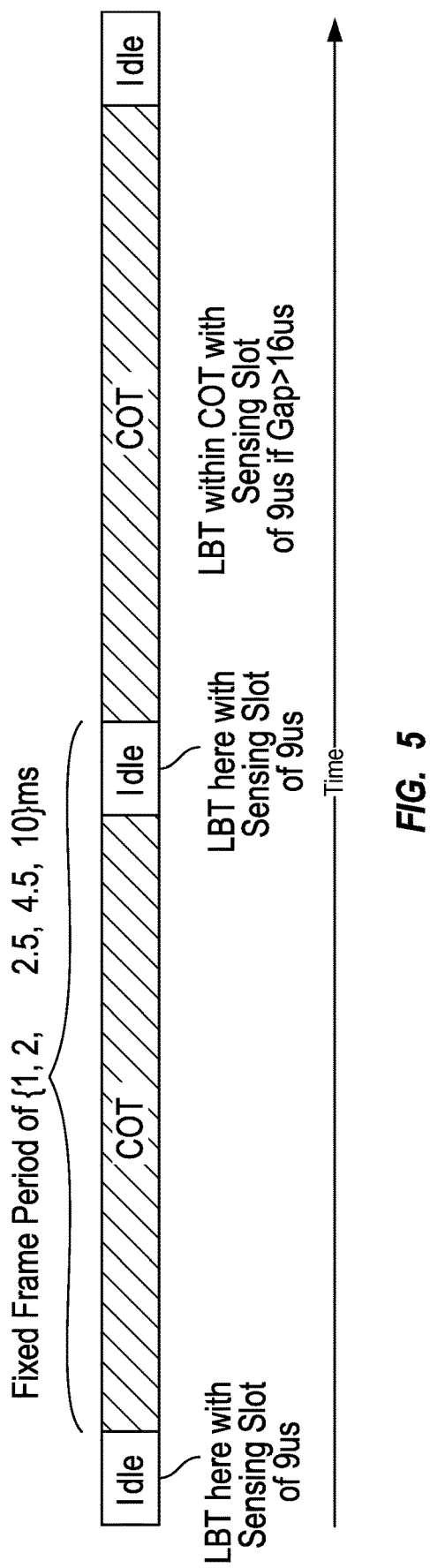
FIG. 5 is a timing diagram illustrating an example of a fixed-frame channel access procedure.

In certain cases, the network may employ a frame-based LBT scheme, which may be initiated by the network with a fixed frame structure. Frame-based LBT may be used for environments with long-term absence of other radio access technologies (e.g., WLAN), which may be guaranteed by regulation or policies. Frame-based LBT may provide coordinated sensing to achieve channel reuse within the same network. For example, FIG. 5 is a timing diagram illustrating an example of sensing occasions in a frame-based LBT scheme. In this example, a sensing occasion may be arranged between channel occupancy times (COTs). As an example, the sensing occasions may have a duration of 9 µs, and the duration of a COT and sensing occasion may be 1, 2, 2.5, 4.5, or 10 ms.

In certain cases, an LBT scheme may be employed for mmWave bands, such as NRU at 60 GHz bands. At mmWave bands, the network may support subcarrier spacings of 120 kHz, 480 kHz, or 960 kHz, which provide a slot duration of 125 µs, 31.25 µs, and 15.625 µs, respectively. NRU at mmWave bands may employ no-LBT (e.g., Type 2C), energy-detection based LBT, receive-assisted LBT, directional LBT, LBT for COT with multi-beams, or other suitable schemes. There may be no gap constraints within a COT.

In certain cases, the LBT scheme for mmWave may employ a procedure similar to Type 1. A sensing occasion may have a random duration (e.g., 0 to 30 sensing slots). The initial deferral period may be 8 µs, the sensing occasion may be 5 µs, and the COT may be less than 5 ms.

Figure 6:
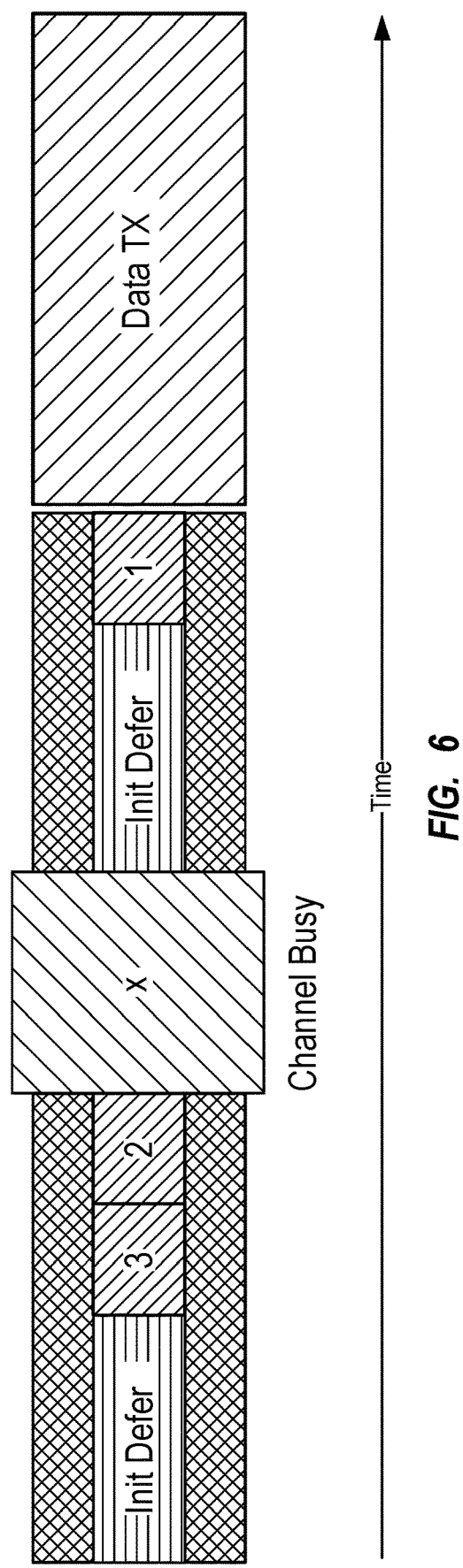
FIG. 6 is a timing diagram illustrating an example of a channel access procedure for millimeter wave bands.

FIG. 6 is a timing diagram illustrating an example of a sensing occasion having a random duration for unlicensed mmWave bands. In this example, after a defer period, a UE may sense the channel for a sensing occasion having a random duration (e.g., a random number of N sensing slots). If the channel is sensed to be busy, the UE may restart the defer period and continue sensing the channel in the remaining sensing slots of the countdown period.

In certain cases, there may be no LBT for short control signaling in unlicensed mmWave bands. For example, signaling with a low-duty cycle up to 10 ms occupation within a 100 ms observation period may not use LBT.

For NRU, there may be constraints over multiple LBT channels. For example, one LBT channel may be limited by a max bandwidth of 20 MHz, which may match the lowest bandwidth supported for a WLAN channel. In NRU, a component carrier may have a channel bandwidth greater than 20 MHz, and thus, a UE may sense for energy over multiple LBT channels. In FR1, a component carrier may have bandwidth up to 100 MHz with at least 5 LBT channels, and in FR2, a component carrier may have bandwidth up to 400 MHz with at least 20 LBT channels. In case of Type 1 LBT, one of the LBT channels may be randomly chosen to perform a Type 1 LBT procedure, and the Type 2 LBT procedure may be used for the remaining the LBT channels.

A DL signal (e.g., PDSCH) or UL signal (e.g., PUSCH) may be allocated with resources overlapping with multiple LBT channels. In certain cases, only a subset of the LBT channels may be idle at a given time. For DL transmissions, the network may use the subset of resources in the frequency domain. That is, the network may puncture the busy frequency resources from the DL resource allocation and use the subset of frequency resources that are idle. In certain cases, for UL transmissions, the LBT scheme may use an "all-or-nothing" mechanism. That is, the UE can only transmit if all the LBT channels overlapping with the UL resource allocation are considered idle. The difference in DL/UL operation may be due to UE's implementation cost and constraint. For example, following a sensing slot, the UE may have a short duration (e.g., <5 µs) to switch from receive mode to transmit mode. Within this very short switch time, it may not be practical for the UE to prepare the time-domain waveform (e.g. performing a Discrete Fourier Transform (DFT)—Inverse Fast Fourier Transform (IFFT) operation) based on LBT status on multiple LBT channels.

Accordingly, certain aspects provide techniques to prepare multiple candidate time-domain waveforms before the LBT, and then the UE selects one waveform during the switch time. However, this may increase storage requirements to store multiple candidate time-domain waveforms at the UE.

In certain aspects, to reduce LBT failure rate for a PUSCH transmission, the network may first trigger a LBT status report from the UE to know the channel idleness conditions over the entire bandwidth beforehand, and then the network can make a scheduling decision for PUSCH based on the received LBT status. This approach can reduce persistent LBT failure to some extent. Channel idleness conditions may change during the PUSCH scheduling gap K2 (between DCI grant and scheduled PUSCH transmission).

Figure 7:
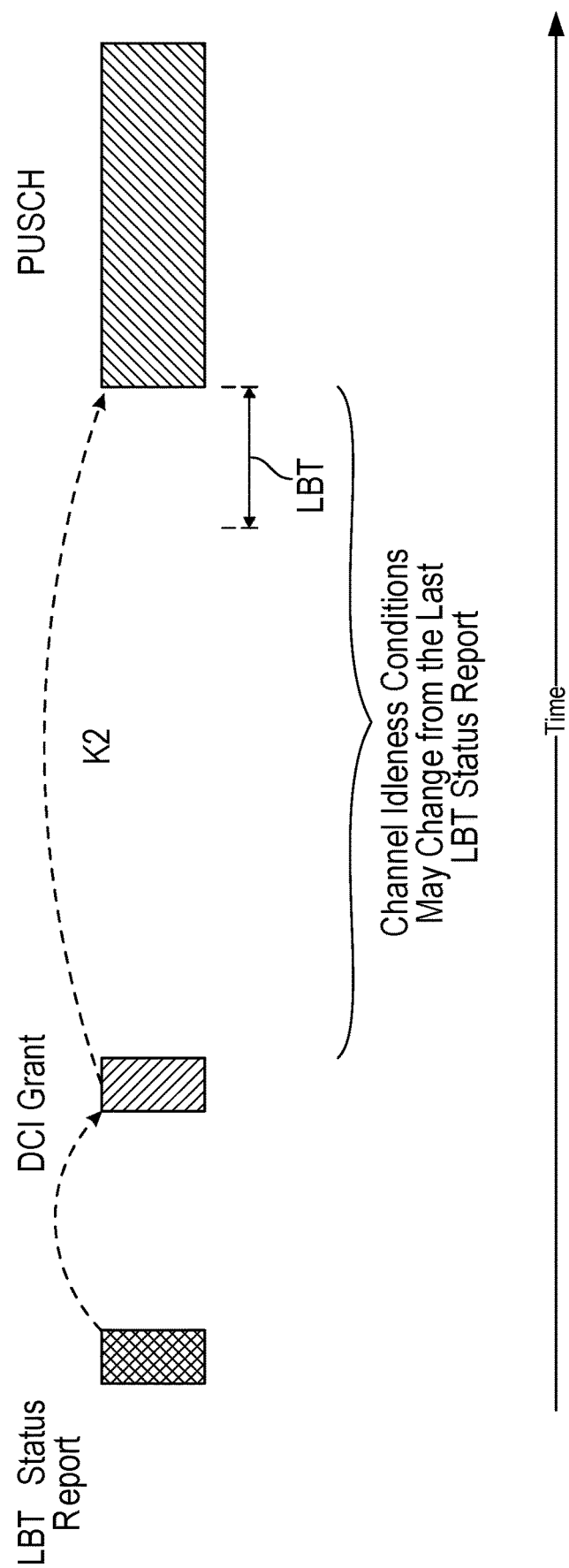
FIG. 7 is a timing diagram illustrating an example of an uplink grant being based on a channel idleness report.

FIG. 7 is a timing diagram illustrating an example of an LBT status report and an uplink resource grant, which may be based on the channel status report. In this example, the UE may transmit an LBT status report, which indicates the LBT channels that are idle and/or busy, to the network. The network may develop a resource allocation for an uplink transmission based on the LBT status report. For example, the resource allocation may use frequency resources that were indicated as being idle in the LBT status report. The network may transmit a DCI grant to the UE with the uplink resource allocation, and the grant may provide a time delay (K2) between when the DCI grant is received and when the time domain resource allocation begins. In the K2 time delay, certain LBT channels scheduled in the resource allocation may become busy. For example, in the LBT sensing occasion depicted in FIG. 7, one of the LBT channels may be detected as being busy. Under the "all-or-nothing" rule for uplink LBT, the UE may refrain from transmitting on the PUSCH due to one of the LBT channels being busy.

As an example, for Type 2 LBT within a network initiated COT, the network may leave a gap (e.g., >25 µs) between the DL to UL transition. In such cases, another node (e.g., a WLAN node) may grab the channel during this gap. In another example, the network may not have sufficient DL data to fill in the scheduling gap K2, and a filler or dummy signal greater than 100 µs is generally not desirable. For Type 1 LBT outside the network's COT, the UE may compete with other nodes (e.g. WLAN nodes) for occupying the channel. Accordingly, what is needed are techniques and apparatus for uplink channel access.

Aspects Related to Conditional Uplink Grant in Unlicensed Spectrum

Aspects of the present disclosure provide apparatus and techniques for uplink channel access using a conditional uplink grant. Such a grant may provide resource candidates from which the UE selects based on energy sensed in an LBT sensing occasion. For example, the PUSCH preparation time can be divided into two parts: a first part for encoding, rate matching, etc., and a second part for mapping the coded bits to time/frequency/spatial resources that may depend on LBT status. The first part of the preparation time can be done independently from the LBT status, and the second part of the preparation time can be performed based on the LBT status. For example, encoding an uplink payload can be done for a given transport block (TB) size, which can be determined based on modulation and coding scheme (MCS) and number of allocated symbols/physical resource blocks (PRBs)/layers. The UE may perform the first part of the preparation time during a portion of the K2 time delay, for example, before an LBT sensing occasion. The frequency location of allocated resources may be selected based on the LBT status (e.g., idle or busy state) of particular LBT channels. For example, the second part of the preparation time may be performed following an LBT sensing occasion, based on the energy sensed in the sensing occasion. The conditional grant with resource candidates (e.g. a list of candidate time/frequency/spatial resources etc.) may enable a UE to determine idle channels based on more recent channel sensing results within a PUSCH preparation time. Cancellation of an uplink transmission due to LBT failure may be reduced greatly because the UE may use a subset of resources allocated for the uplink transmission, and the selection of the resources may be based on more recent channel sensing results within the PUSCH preparation time.

Figure 8:
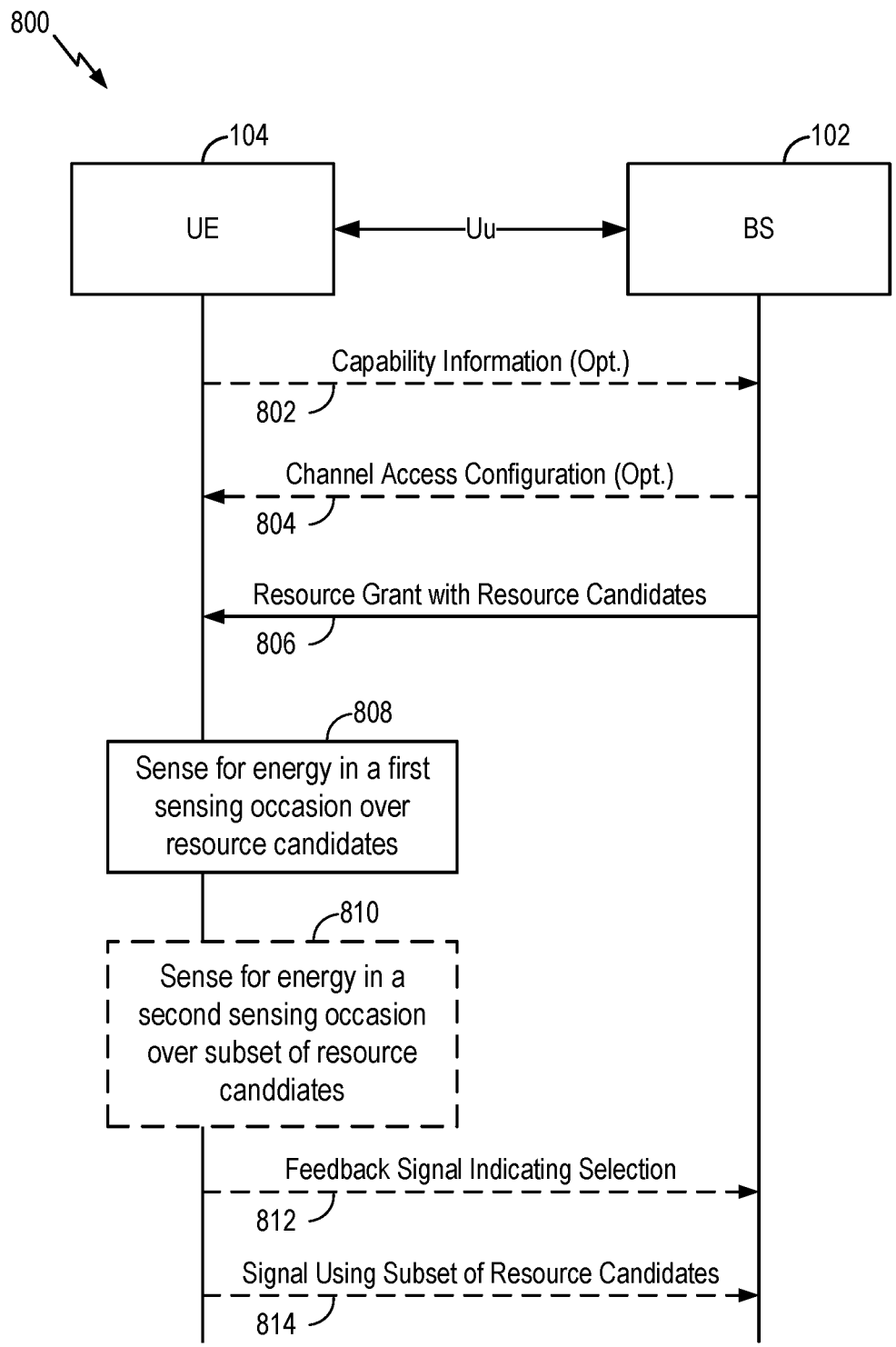
FIG. 8 is a signaling flow diagram illustrating uplink channel access using a conditional uplink grant, for example, in an unlicensed spectrum.

FIG. 8 depicts an example signaling flow 800 for uplink channel access using a conditional uplink grant, for example, in an unlicensed spectrum. The flow may optionally begin at step 802, where the UE 104 may provide capability information associated with uplink channel access, such as the preparation times supported by a UE to perform uplink channel access. For example, the capability information may include a first preparation time that is independent of the LBT sensing (e.g., encoding and/or rate matching), and a second preparation time that depends on the LBT sensing (such as frequency and/or spatial domain selection).

Optionally, at step 804, the BS 102 may transmit a channel access configuration to the UE 104. For example, the channel access configuration may provide the duration, location (e.g., time domain location), and/or type (e.g., Type 1 or 2) of a sensing occasion for LBT. The channel access configuration may provide the priorities for certain resource candidates used for channel access.

At step 806, the UE 104 may receive a resource grant indicating resource candidates for an uplink signal. For example, the resource candidates may include multiple sub-channel candidates for the UE to determine the idle state and use for transmission of the uplink signal.

At step 808, the UE 104 may sense for energy in a first sensing occasion over the resource candidates. For example, the UE 104 may sense for energy over the sub-channel candidates in the first sensing occasion. The first sensing occasion may occur before the second preparation that depends on the LBT sensing, for example, as described herein with respect to FIG. 9A. The UE 104 may use the energy sensed at step 808 to determine which of the sub-channel candidates are considered idle or busy.

Optionally, at step 810, the UE 104 may sense for energy in a second sensing occasion over a subset of the resource candidates. For example, the UE 104 may identify that one of the sub-channels is considered to be idle, and in the second sensing occasion, the UE may sense for energy using the idle sub-channel. The subset of resource candidates may be selected based on the energy sensed in the first sensing occasion.

Optionally, at step 812, the UE 104 may transmit a feedback signal, to the BS 102, indicating the subset of resource candidates selected by the UE for the uplink transmission. As further described herein, the indication of the resource selection may be implicitly indicated, for example, by transmitting the feedback signal over the subset of resource candidates. In certain cases, the indication of the resource may be provided explicitly, for example, in uplink control information (UCI).

Optionally, at step 814, the UE 104 may transmit the uplink signal using the subset of resource candidates, for example, if the energy sensed in the second sensing occasion is detected as being idle.

Figure 9A:
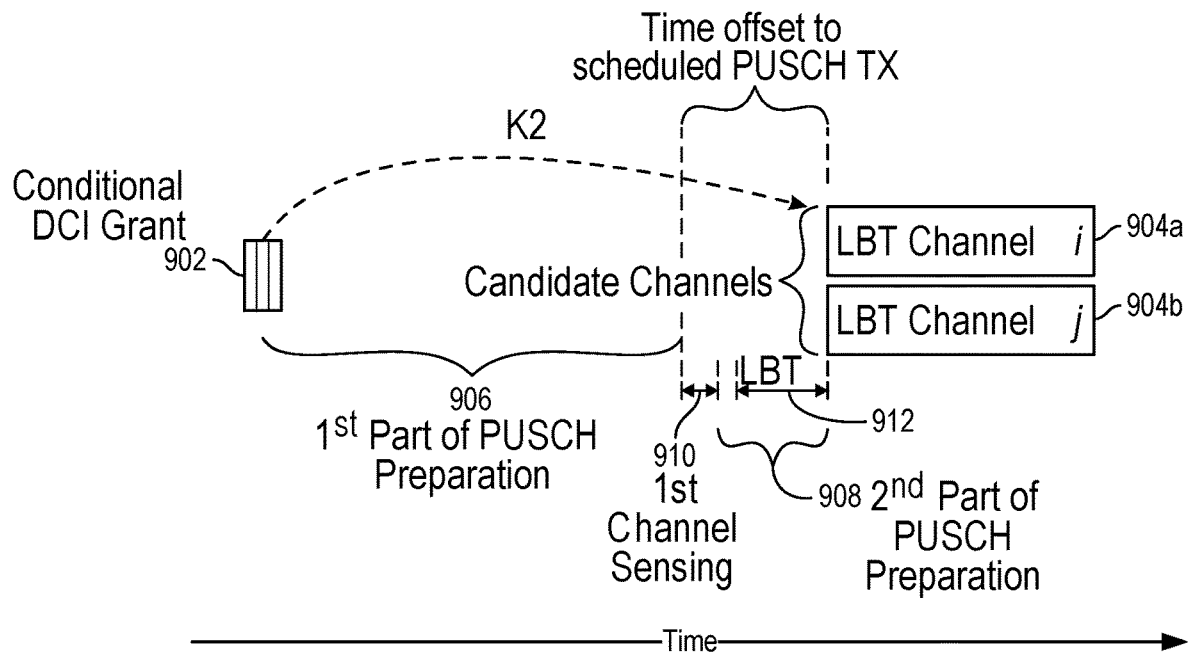
FIG. 9A is a timing diagram illustrating an example of uplink channel access for frequency domain candidates indicated in a resource grant.

FIG. 9A is a diagram illustrating an example of channel access sensing for frequency domain candidates, in accordance with certain aspects of the present disclosure. In this example, the UE may receive a DCI grant 902 indicating multiple channel candidates (904a, 904b) for transmitting an uplink signal. The channel candidates may be indicated as a number of PRBs and/or a list of PRB indices, for example, within a bandwidth part (BWP). The DCI grant 902 may indicate a scheduling offset K2 for the resource candidates. That is, the DCI grant 902 may be separated in time from the resource candidates by a gap (K2). The gap K2 may have a first part of the PUSCH preparation time 906, which is independent of the LBT sensing, and a second part of the PUSCH preparation time 908, which depends on the LBT sensing.

The UE may partially prepare the uplink signal for transmission during the first part of the preparation time 906. For example, the UE may encode and perform rate matching on the payload during the first part of the preparation time 906. The first part of the preparation time 906 may occur before the second part of the preparation time 908. In certain cases, the first part of the preparation time 906 may partially overlap with a first sensing occasion 910.

In a first sensing occasion 910, the UE may sense for energy over all of the channel candidates 904a, 904b. The may UE select a subset of the channel candidates 904a, 904b for PUSCH transmission based on the energy sensed in the first sensing occasion 910. The first sensing occasion 910 may have a random or deterministic duration (e.g., Type 1 or Type 2). The first sensing occasion 910 can have a short duration, e.g., 16 μs or 25 μs, to get the channel idleness conditions for channel selection. As an example, the energy sensed in the first sensing occasion 910 may provide that the first channel candidate 904a is idle and the second channel candidate 904b is busy. The first sensing occasion 910 may be arranged in time to occur before the second part of the preparation time 908. The first sensing occasion 910 may be arranged in time to provide the UE with sufficient time to prepare the waveform based on the results from the first sensing occasion 910, perform the LBT in the second sensing occasion 912 on the selected channel detected as being idle during the first sensing occasion 910, and switch to transmit mode after detecting the selected channel as being idle in the second sensing occasion 912.

During the second part of the preparation time 908, the UE may select the frequency resources (e.g. the channel candidate 904a) for transmission of the uplink signal based on the first sensing results, prepare the corresponding waveform of the uplink signal based on the selected frequency resources (e.g., identifying specific resource blocks, resource mapping, scrambling, and/or preparing the time-domain waveform), perform channel sensing at the second sensing occasion 912, and switch from receive mode to transmit mode after sensing the selected channel in the second sensing occasion 912. In a second sensing occasion 912, the UE may sense for energy over a subset of the channel candidates, such as the channel candidate(s) selected based on the energy sensed in the first sensing occasion 910. The UE may perform the LBT procedure in the second sensing occasion 912 prior to the scheduled PUSCH transmission. In certain aspects, the sensing occasion 912 may include enough time for the UE to switch from receive mode to transmit mode after detecting the selected channel as being idle. The LBT in the second sensing occasion 912 may be Type 1 or Type 2, and the type of the LBT may be indicated in the DCI grant 902. If the channel candidate 904a is considered to be idle in the second sensing occasion 912, the UE may transmit the uplink signal using the channel candidate 904a. If the channel candidate 904a is considered to be busy in the second sensing occasion 912, the UE may cancel the PUSCH transmission and refrain from transmitting. The two-step channel sensing depicted in FIG. 9A may reduce cancellation of the PUSCH transmission, for example, due to the UE being able to select a subset of idle resources and selecting the resources at a closer time to the actual transmission. In certain cases, the UE may perform the two-step channel sensing if the time offset from the first sensing occasion (e.g., the first symbol of the first sensing occasion) to the scheduled PUSCH transmission time (e.g., the first symbol of the PUSCH transmission) is at least greater than the duration of the sum of the first sensing occasion and the second part of PUSCH preparation time.

If the second sensing occasion is Type 2 LBT with a duration of 16 μs or 25 μs (e.g. PUSCH transmission within the network's initiated COT), the first sensing occasion may be arranged in time ahead of the second sensing occasion. If the second sensing occasion is Type 1 LBT with a random duration, the first sensing occasion can be partially overlapping with the second sensing occasion.

The DCI grant and/or other control signaling (e.g., radio resource control (RRC) signaling, medium access control (MAC) signaling, and/or system information) may indicate the time domain location, duration, and/or type of channel access procedure (e.g., Type 1 or 2) for the first sensing occasion and/or second sensing occasion. In certain aspects, the time domain location, duration, and/or type of channel access procedure (e.g., Type 1 or 2) for the first sensing occasion and/or second sensing occasion may be preconfigured at the network and UE.

To facilitate efficient frequency resource utilization, the resource candidates for different UEs may be staggered in time from each other. For example, the network may send conditional PUSCH grants to multiple UEs, where each UE is assigned resource candidates with slightly different starting points in time. As such, UEs with later starting points may only select the remaining candidate frequency domain locations left over from UEs with earlier starting points. Different starting points can be achieved by assigning different starting symbols for different UEs or same starting symbol with different cyclic prefix extension (e.g., normal or extended). Assuming far-apart UEs experience independent channel idleness conditions, gNB can schedule multi-UEs with conditional PUSCH grants with overlapping resources to fully utilize communication resources.

Figure 9B:
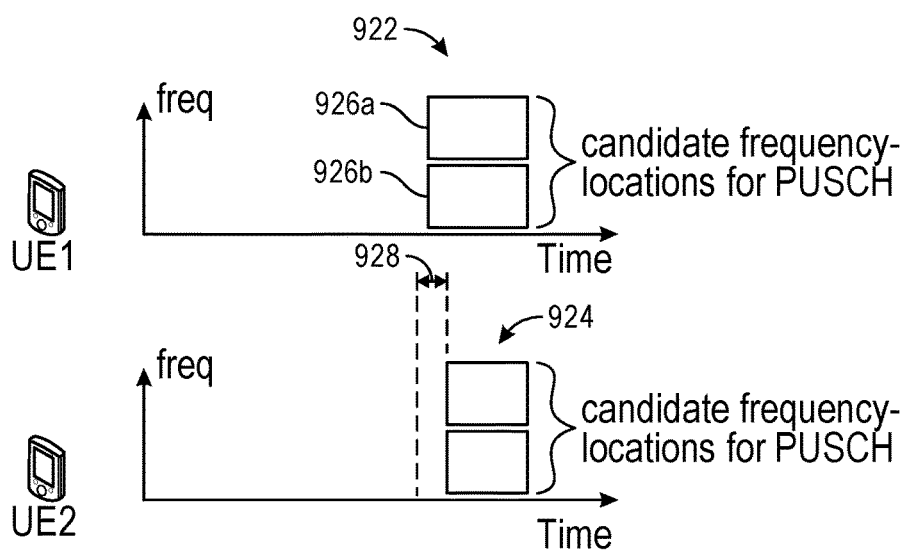
FIG. 9B is a diagram illustrating an example of arranging sets of resource candidates across multiple UEs.

FIG. 9B is a diagram illustrating an example of arranging sets of resource candidates across multiple UEs, in accordance with certain aspects of the present disclosure. In this example, the network may allocate resource candidates 922 to UE1 starting at a first time domain position and allocate resource candidates 924 to UE2 starting at a second time domain position. The resource candidates 922 and 924 may have the same frequency channels 926a, 926b. The second time domain position may be offset from the first time domain position by a gap 928, for example, one or more symbols. If multiple LBT channels are considered to be idle in the first sensing occasion for UE1, UE1 can randomly select one of the LBT channels. For example, if UE1 selects and transmits the first channel 926a, UE1 will likely block UE2 from selecting the first channel 906a, and UE2 may select and transmit on the second channel 906b.

Figure 10:
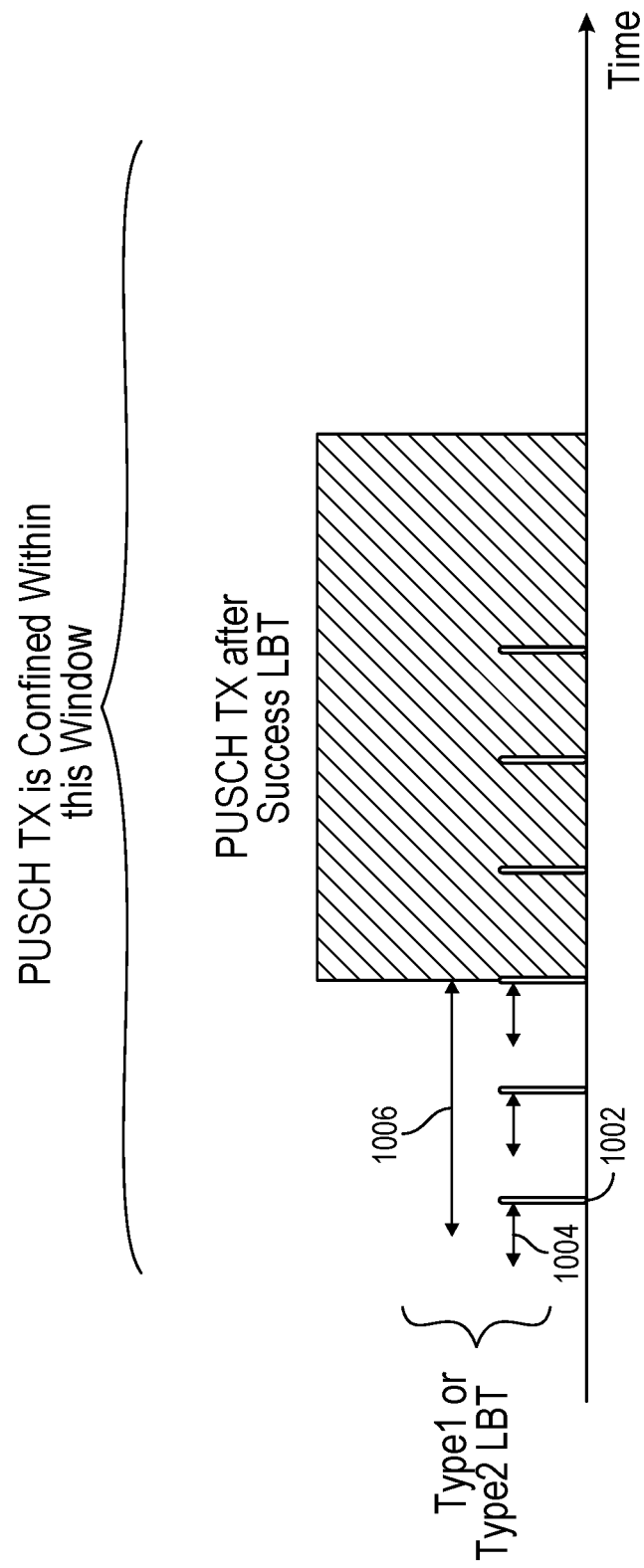
FIG. 10 is a timing diagram illustrating an example of uplink channel access for time domain candidates.

FIG. 10 is a diagram illustrating an example of channel access sensing for time domain candidates, in accordance with certain aspects of the present disclosure. In this example, the DCI grant (not shown) may indicate time domain resource candidates. For example, the time domain resource candidates may be indicated as a number of allocated symbols, a list of candidate starting locations in time, and/or a time window for starting locations. For each time domain candidate 1002, the UE may prepare the associated time-domain waveform beforehand, until a channel in a time domain candidate is detected as being idle in a sensing occasion 1004 that occurs before the time domain candidate. Since the scrambling sequence for the DMRS depends on the symbol index, the UE may keep preparing the time-domain waveform for the DMRS symbols associated with different starting locations of the time domain candidates. The time offset between two consecutive time domain candidates may be at least larger than second part of the PUSCH preparation time.

For Type 1 LBT, the UE may sense the channel and update the counter based on sensing results in a running sensing occasion 1006 until the channel is considered to be idle. That is, for Type 1 LBT, the duration of the sensing occasion 1006 may continue to run within the time window until the channel is considered to be idle.

For Type 2 LBT, the UE may sense the channel prior to (e.g., as closed as feasible in time to) each time domain candidate until the channel is considered to be idle. In FIG. 10, the UE detects the channel to be idle in the third sensing occasion 1004, which occurs before the third time domain candidate 1002.

The resource overhead due to uncertainty of the allocation can be minimized by allocating multiple UEs with conditional grants within the same time window or overlapping time windows, where each grant provides a different list of candidate starting locations in time. The channel sensing depicted in FIG. 10 may reduce cancellation of the PUSCH transmission, for example, due to the UE being able to continue sensing for an idle channel until the channel is considered to be idle.

Figure 11:
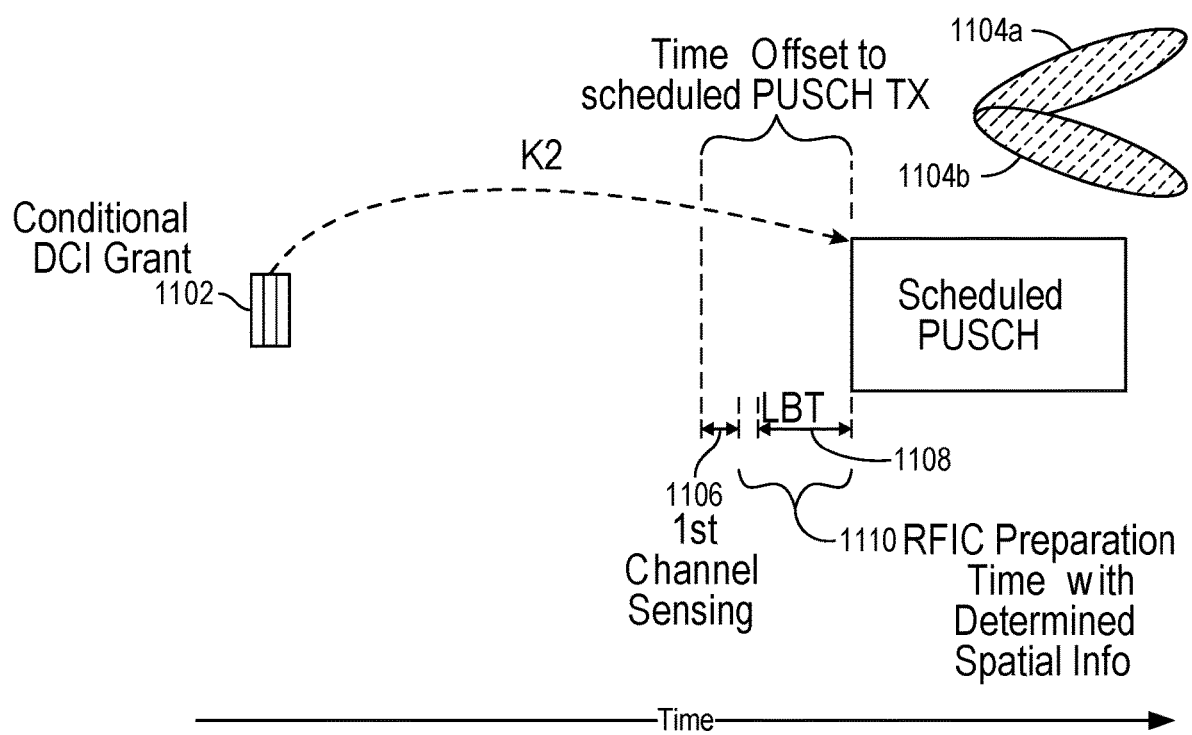
FIG. 11 is a timing diagram illustrating an example of uplink channel access for spatial domain candidates.

FIG. 11 is a diagram illustrating an example of channel access sensing for spatial domain candidates, in accordance with certain aspects of the present disclosure. In this example, the UE may receive a DCI grant 1102 indicating spatial domain candidates 1104a, 1104b for transmission of an uplink signal. As an example, the spatial domain candidates may include a list of candidate spatial directions. As used herein, a spatial domain candidate may refer to a specific beam or spatial channel. The spatial domain candidate may be indicated by spatial parameter(s) for receive and/or transmit beamforming, such as a spatial filter for beamforming, an angle of arrival (AoA), AoA spread, dominant AoA, average AoA, Power Angular Spectrum (PAS) of AoA, angle of departure (AoD), AoD spread, average AoD, PAS of AoD, transmit/receive channel correlation, transmit/receive beamforming, spatial channel correlation, etc.

Similar to the frequency domain candidates, the UE may sense for energy using a two-step channel sensing scheme in a first sensing occasion 1106 and a second sensing occasion 1108. The UE may sense for energy over the spatial domain candidates 1104a, 1104b in the first sensing occasion 1106. For example, the UE may sense for energy in a channel using the beamforming associated with the spatial domain candidates 1104a, 1104b. The UE may select the spatial candidate (e.g., the spatial candidate 1104a) that is considered to be idle based on the energy sensed in the first sensing occasion 1106. The first sensing occasion 1106 may occur before the scheduled PUSCH transmission with enough preparation time 1110 to select and configure the beamforming based on the energy sensed in the first sensing occasion 1106. The first sensing occasion 1106 can have a short duration, e.g., 16 µs or 25 µs, to get the channel idleness conditions for selection of the beamforming direction out of the spatial domain candidates. The second sensing occasion 1108 may occur prior to (e.g., as close to as feasible) the PUSCH transmission in order to determine if the channel of the selected spatial candidate is idle. The LBT in the second sensing occasion 912 may be Type 1 or Type 2, and the type of the LBT may be indicated in the DCI grant 1102.

If the channel for the spatial domain candidate 1104a is considered to be idle in the second sensing occasion 1108, the UE may transmit the uplink signal using the spatial domain candidate 1104a. If the channel for the spatial domain candidate 1104a is considered to be busy in the second sensing occasion 1108, the UE may cancel the PUSCH transmission and refrain from transmitting. In certain cases, the UE may perform the two-step channel sensing if the time offset to from the first sensing occasion to the scheduled PUSCH transmission time is at least greater than the duration of the sum of the first sensing occasion and the preparation time for the selected spatial domain candidate (e.g., at least sufficient time for preparation of selected spatial direction based on the first sensing result). In certain cases, the UE may only use a single sensing occasions to identify an idle channel if the spatial preparation time can be fit within the receive-to-transmit switch time within the sensing occasion. The channel sensing depicted in FIG. 11 may reduce cancellation of the PUSCH transmission, for example, due to the UE being able to select a subset of idle resources at a much closer time to the actual transmission.

While the examples depicted in FIGS. 9A, 9B, 10, and 11 are described herein with respect to separate implementations to facilitate understanding, aspects of the present disclosure may also be applied to an implementation that combines aspects described herein with respect to FIGS. 9A, 9B, 10, and 11. For example, the UE may receive resource candidates indicating frequency domain, time domain, and/or spatial domain candidates, where the UE may sense for energy as described herein with respect to FIGS. 9A, 10, and/or 11.

Example Methods of Conditional Uplink Grant in Unlicensed Spectrum

Figure 12:
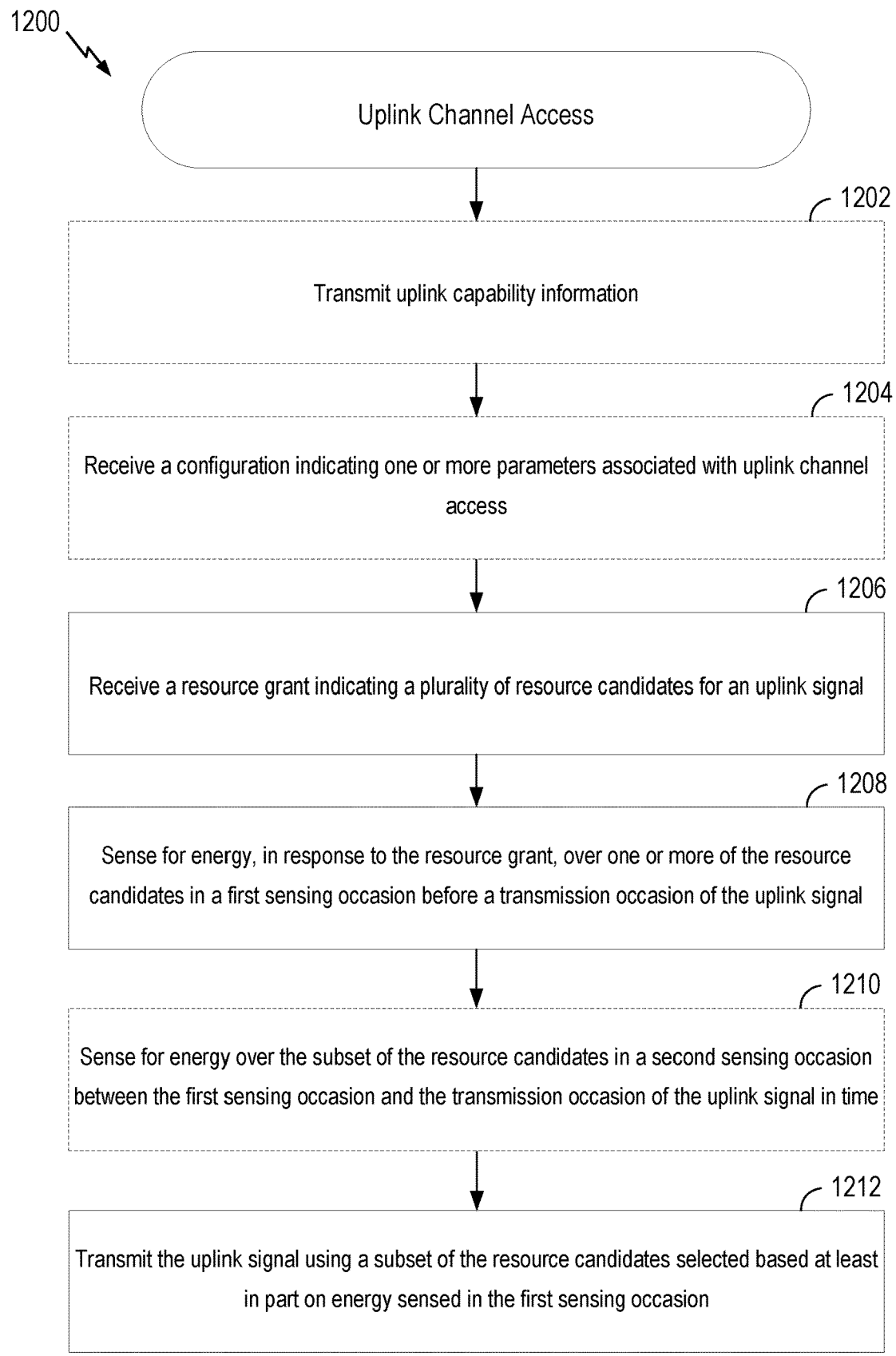
FIG. 12 depicts an example method for uplink channel access, for example, in an unlicensed spectrum.

FIG. 12 depicts an example method 1200 for uplink channel access, for example, in an unlicensed spectrum.

The method 1200 may optionally begin, at step 1202, where a UE (e.g., the UE 104 depicted in FIG. 1) transmit uplink capability information to a network entity (e.g., the BS 102 depicted in FIG. 1). For example, the uplink capability information may indicate the preparation time(s) supported by the UE for performing uplink channel access. In aspects, the capability information may indicate a first preparation time that is independent of the frequency resources (such as a preparation time for at least encoding and rate matching an uplink payload), a second preparation time that depends on the frequency resources (such as a preparation time for at least resource mapping, scrambling, and generating a time-domain waveform), and/or a preparation time that depends on the spatial resources (such as a preparation time for preparing beamforming or a spatial filter).

Optionally, at step 1204, the UE may receive a configuration indicating one more parameters associated with uplink channel access. For example, the UE may receive the configuration from the network entity. The configuration may be received via RRC signaling, MAC signaling, DCI, and/or system information. The configuration may include at least one of a location in time, duration, or type of a first sensing occasion and/or a second sensing occasion. In aspects, the location of the sensing occasions may be indicated by a duration of an offset relative to a starting point, such as the last symbol of a PDCCH or the last symbol of a sensing occasion. The configuration may include one or more priorities for certain resources, which may be used to select a resource when there are multiple resource candidates that are detected as being idle.

At step 1206, the UE may receive a resource grant (e.g., a DCI message from the network entity) indicating a plurality of resource candidates for an uplink signal. For example, the UE may receive frequency domain, time domain, and/or spatial domain candidates as described here with respect to FIG. 9A, FIG. 10, and/or FIG. 11. The resource candidates may include at least a first resource candidate and a second resource candidate, where each of the resource candidates includes at least one of a frequency domain resource (e.g., one or more resource blocks), a time domain resource (e.g., one or more symbols), or a spatial domain resource (e.g., one or more spatial parameters associated with beamforming).

At step 1208, the UE may sense for energy, in response to the resource grant, over one or more of the resource candidates in a first sensing occasion before a transmission occasion of the uplink signal. That is, the first sensing occasion may occur before the scheduled transmission time of the uplink signal. In certain aspects, the UE may sense for energy based on the resource grant and/or the configuration, for example, using the parameter(s) associated with uplink channel access indicated in the configuration and/or resource grant. The UE may select a subset of the resource candidates that is idle based on the energy sensed in the first sensing occasion that is less than or equal to a threshold (e.g., the energy detection threshold for uplink channel access). For example, the subset of the resource candidates may be selected based on the subset of the resource candidates having energy sensed in the first sensing occasion that is less than or equal to a threshold.

Optionally, at step 1210, the UE may sense for energy over a subset of the resource candidates in a second sensing occasion between the first sensing occasion and the transmission occasion of the uplink signal in time. The UE may perform two-step channel sensing as described herein with FIG. 9A and/or FIG. 11. That is, the first sensing occasion may be used to identify idle resource candidates, and the second sensing occasion may be used to confirm whether the selected resource candidate is still idle. In aspects, the second sensing occasion may partially overlap with the first sensing occasion in time.

At step 1212, the UE may transmit (during the transmission occasion) the uplink signal using a subset of the resource candidates selected based at least in part on energy sensed in the first sensing occasion. For example, the UE may select the subset of resource candidates are idle in the first sensing occasion based on the energy sensed in the first sensing occasion. In aspects, the UE may transmit the uplink signal if the channel associated with the subset of resource candidates is considered to be idle based on energy sensed in the second sensing occasion. A channel may be considered to be idle if the energy sensed in the channel is less than or equal to a threshold. In certain aspects, the UE may use the same threshold or different thresholds for the results sensed in the first and second sensing occasions. The subset of resource candidates may include a portion of the resource candidates, such as one or more of the resource candidates, but not all of the resource candidates.

In aspects, the first sensing occasion and/or second sensing occasion may be used for Type 1 and/or Type 2 uplink channel access. For example, sensing for energy in the first sensing occasion and/or the second sensing occasion may be performed according to at least one of a Type 1 or a Type 2 uplink channel access procedure.

The UE may apply certain selection criteria (e.g., random and/or certain priorities) for selecting the subset of resource candidates, for example, when multiple candidates are identified as being idle in the first sensing occasion. As an example, the subset of the resource candidates may be selected randomly among the resource candidates that are considered to be idle based on energies sensed in the first sensing occasion (such as energies that are less than or equal to a threshold). For example, suppose that the UE detects two resource candidates that are idle in the first sensing occasion. The UE may randomly select one of these idle resource candidates as the subset of resource candidates.

In certain cases, the subset of the resource candidates may be selected based on priorities associated with the resource candidates that are considered to be idle based on energies sensed in the first sensing occasion (such as energies that are less than or equal to a threshold). For example, suppose the UE is configured with a first resource candidate having a first priority and second resource candidate having a second priority that is lower than the first priority. If both of the resource candidates are detected as being idle in the first sensing occasion, the UE may select the first resource candidates as the subset based on the first resource candidate having a higher priority than the second resource candidate.

For certain aspects, the UE may indicate the selected subset of resource candidates to the network entity before transmitting the uplink signal. Such an indication may enable the network entity to efficiently allocate resources to other UE and/or perform the reception of the uplink signal. For example, the method 1200 may include the UE transmitting an indication of the subset of the resource candidates that will be used for transmission of the uplink signal. The UE may send a feedback signal indicating the subset of candidate resources, e.g., via PUCCH and/or a sounding reference signal (SRS). The feedback signal (e.g., SRS) may be transmitted over the subset of resource candidates to provide an implicit indication of the subset of resource candidates. The feedback signal (e.g., the PUCCH) may carry information to provide an explicit indication of the subset of resource candidates.

In certain aspects, the UE may perform two-step channel sensing over frequency domain candidates at steps 1208 and 1210 as described herein with respect to FIG. 9A. For example, the resources candidates may include a plurality of frequency domain candidates. The transmission occasion of the resource candidates is separated in time from the resource grant by a gap that includes a first preparation time (e.g., the first part of the preparation time 906) and a second preparation time (e.g., the second part of the preparation time 908) associated with the uplink signal. The first sensing occasion may occur before the second preparation time. The UE may sense for energy over the subset of the resource candidates in the second sensing occasion that occurs within the second preparation time, which may occur before the transmission occasion of the uplink signal. The UE may transmit the uplink signal using the subset of the resource candidates selected based on energy sensed in the first sensing occasion and the second sensing occasion, for example, as described herein with respect to FIG. 9A.

The first sensing occasion may occur at a time with at least the first preparation time after reception of resource grant and with at least the second preparation time before the transmission occasion of the uplink signal. The first preparation time may include a first part of overall preparation time for the uplink signal that is independent of the frequency domain resources selected based on the energy sensed in the first sensing occasion. The second preparation time may include a second part of the overall preparation time for the uplink signal that depends on the selected frequency domain resources.

For certain aspects, the UE may perform the channel sensing over time domain candidates at step(s) 1208 and/or 1210 as described herein with respect to FIG. 10. For example, the resource grant may indicate a plurality of sensing occasions within a sensing window, and the UE sense for energy using a different one of the resource candidates in at least one of the sensing occasions until a channel is detected as being idle (e.g., a channel having an energy that is less than or equal to a threshold) the corresponding sensing occasion in the sensing window. In certain cases, the UE may sense for energy on a channel until the channel is detected as being idle in the sensing window.

As an example, the resource candidates may include a first time domain candidate and a second time domain candidate. The first sensing occasion occurs before the first time domain candidate. The UE may sense for energy over a frequency resource associated with the first time domain candidate in the first sensing occasion. The UE may identify that the energy sensed over the frequency resource in the first sensing occasion is busy (e.g., greater than or equal to a threshold). The UE may sensing for energy, in response to the identification, over the frequency resource associated with the second time domain candidate in the second sensing occasion before the second time domain candidate. The UE may identify that the energy sensed over the frequency resource in the second sensing occasion is idle (e.g., less than or equal to a threshold). The UE may transmit the uplink signal using the subset of the resource candidates selected based on energy sensed in the first sensing occasion and the second sensing occasion.

The UE may determine whether to transmit the uplink signal at the first time domain candidate based on the first sensing result performed at the first sensing occasion before the first time domain candidate. The UE may transmit the uplink signal if the channel is detected to be idle in the first sensing occasion. Otherwise, the UE will perform a second sensing at the second sensing occasion before the second time domain candidate and determine whether to transmit based on the second sensing results. The gap between two time domain candidates may have a duration that is at least larger than a part of the overall preparation time for the uplink signal, which depends on the sensing results of the corresponding time domain candidate.

In certain aspects, the UE may perform the channel sensing over spatial candidates at step(s) 1208 and/or 1210 as described herein with respect to FIG. 11. As an example, the resource candidates may include a plurality of spatial domain candidates, where the first sensing occasion ends with enough time for preparation of a selected spatial domain candidate of the spatial domain candidates based on the energy sensed in the first sensing occasion. The UE may select a spatial domain candidate based on the channel being idle in the first sensing occasion, and the UE may sense for energy in the second sensing occasion over the channel using the selected spatial domain candidate.

In aspects, the resource grant may indicate other parameters associated with the channel access. The resource grant may include at least one of a location in time, duration, or type of the first sensing occasion and/or the second sensing occasion. For example, the resource grant may indicate that the first sensing occasion is Type 1 with a random duration. The resource grant may include a priority associated with at least one of the resource candidates. In aspects, the location of the sensing occasions may be indicated by a duration of an offset relative to a starting point, such as the last symbol of a PDCCH, which carries the resource grant, or the last symbol of the first sensing occasion.

Figure 13:
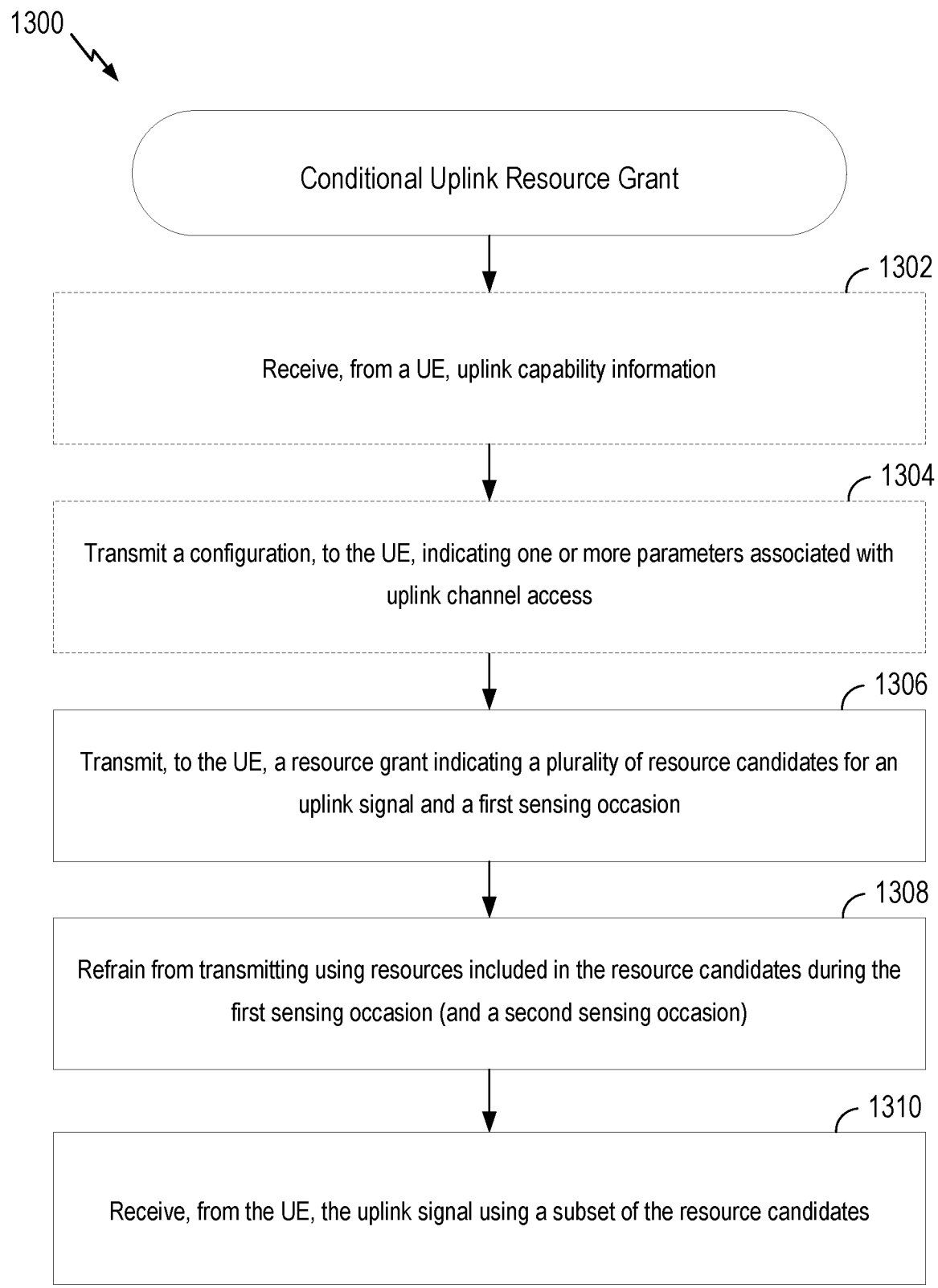
FIG. 13 depicts an example method for providing a conditional uplink resource grant, for example, in an unlicensed spectrum.

FIG. 13 depicts an example method 1300 for providing a conditional uplink resource grant, for example, in an unlicensed spectrum.

The method 1300 may optionally begin, at step 1302, where a network entity (e.g., the BS 102) receive, from a UE (e.g., the UE 104), uplink capability information, such as the uplink capability information described herein with respect to FIG. 12. As used herein, the network entity may refer to a wireless communication device in a radio access network, such as a base station, a remote radio head or antenna panel in communication with a base station, and/or network controller.

Optionally, at step 1304, the network entity may transmit a configuration, to the UE, indicating one or more parameters associated with uplink channel access, for example, as described herein with respect to FIG. 12. In certain cases, the network entity may generate the configuration based on the capability information received at step 1302. For example, suppose the capability information indicates specific durations for the first preparation that is independent of the frequency resources and the second preparation time that depends on the frequency resources. The network entity may configure the location and/or duration of the sensing occasions that take into account these preparation times supported by the UE.

At step 1306, the network entity may transmit, to the UE, a resource grant (e.g., a DCI message) indicating a plurality of resource candidates for an uplink signal and a first sensing occasion, for example, as described herein with respect to FIG. 12. In certain cases, the network entity may configure the resource grant based on the capability information received at step 1302. For example, suppose the capability information indicates specific durations for preparation times supported by the UE. The network entity may configure the duration of the time delay K2 that takes into account these preparation times supported by the UE.

At step 1308, the network entity may refrain from transmitting using resources included in the resource candidates during the first sensing occasion and/or a second sensing occasion. For example, the network entity may refrain from transmitting in a channel associated with the resource candidates during the sensing occasions used by the UE. This may prevent the network entity from causing the channel to be considered busy at the UE during the sensing occasion(s).

At step 1308, the network entity may receive, from the UE, the uplink signal using a subset of the resource candidates, for example, as described herein with respect to FIG. 12.

In certain cases, the network entity may receive, from the UE before receiving the uplink signal, an indication of the subset of the resource candidates that will be used for transmission of the uplink signal. In aspects, the indication may be an explicit indication over the PUCCH or an implicit indication via the SRS, for example, as described herein with respect to FIG. 12.

In certain aspects, due to the uncertainty which resource candidates will be selected by the UE, the network entity may initially monitor all of the resource candidates and switch to receiving via the subset once the network entity identifies the subset. For example, the network entity may identify which resource candidates are selected by the UE based on measurements of the energy in the first symbol (or the first segment of symbols) of the uplink signal. That is, the network entity may measure energy in a first symbol or a first segment of symbols in time (e.g., the first symbol or first segment of symbols in the sequence of symbols that make up the uplink signal) of the uplink signal over the resource candidates. The network entity may identify the subset of the resource candidates based on the energy measured in the first symbol of the first segment of symbols, and the network entity may receive a remaining portion of the uplink signal using the identified subset of the resource candidates. In other words, the network entity may temporarily monitor all of the resource candidates and tune to the subset of the resource candidates once the network identifies the subset of the resource candidates based on the energy measured in the first symbol or the first segment of symbols.

For certain aspects, the network entity may configure the time delay K2 with a duration to provide the UE with enough time for one or more sensing occasions and/or one or more of the preparation times as described herein with respect to FIG. 9A, FIG. 10, and/or FIG. 11.

In certain cases, the network entity may schedule the resource candidates for different UEs with different starting positions, for example, as described herein with respect to FIG. 9B. As an example, the UE may transmit, to a plurality of UEs, resource grants indicating a set of resource candidates for each of the UEs, where the sets of resource candidates are allocated in separate transmission occasions, which are staggered in time with each other. For example, each transmission occasion for the sets of resource candidates may have a different starting position in time. The network entity may receive signals from at least one of the UEs using the set of resource candidates.

Example Wireless Communication Devices

Figure 14:
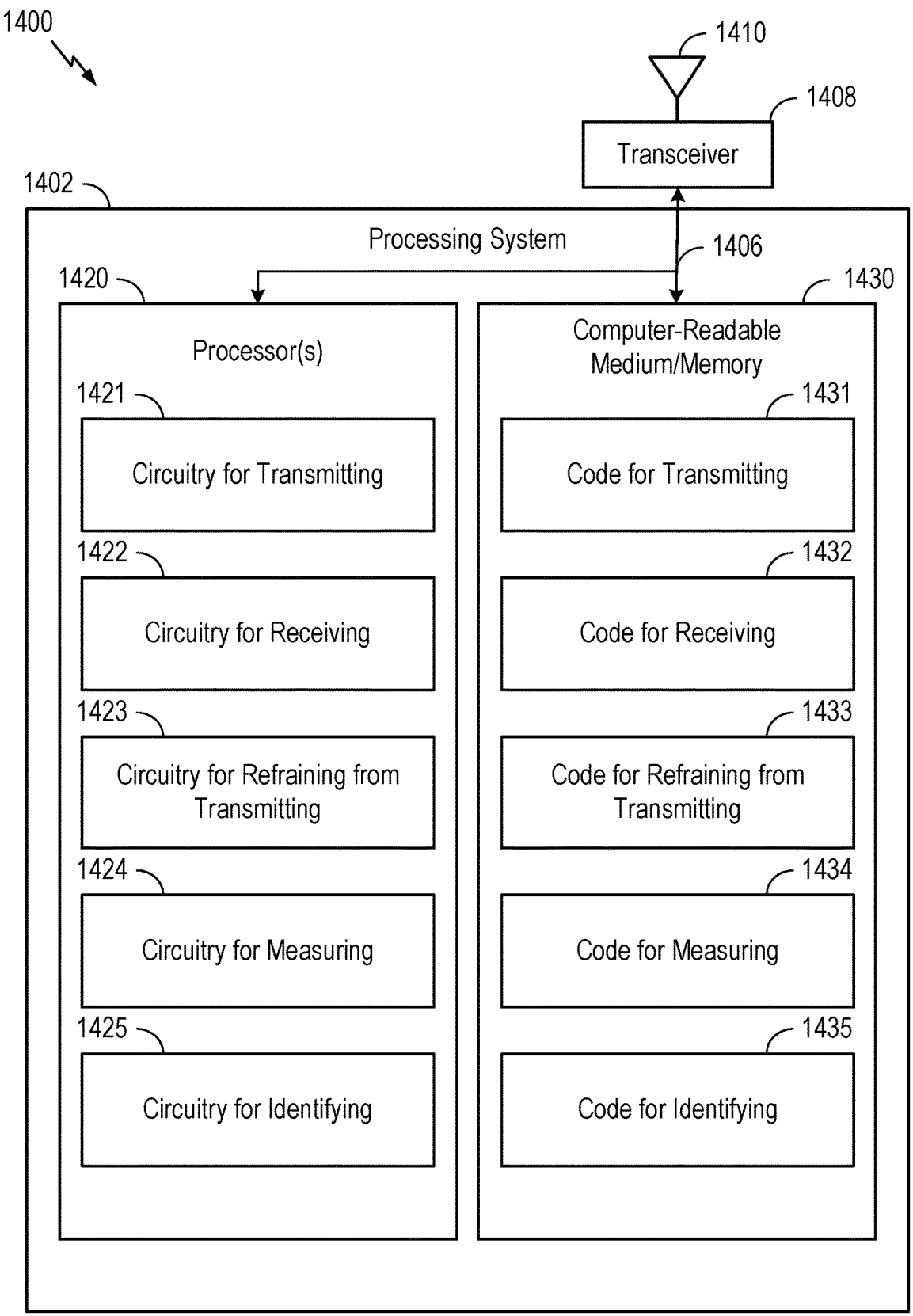
FIG. 14 depicts aspects of an example communications device.

FIG. 14 depicts an example communications device 1400 (e.g., a base station) that includes various components operable, configured, or adapted to perform operations for the techniques disclosed herein, such as the operations depicted and described with respect to FIGS. 8-11 and 13. In some examples, communication device 1400 may be a base station 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 8-11 and 13, or other operations for performing the various techniques discussed herein for a conditional channel grant.

In the depicted example, computer-readable medium/memory 1430 stores code 1431 for transmitting, code 1432 for receiving, code 1433 for refraining from transmitting, code 1434 for measuring, and/or code 1435 for identifying.

In the depicted example, the one or more processors 1420 include circuitry configured to implement the code stored in the computer-readable medium/memory 1430, including circuitry 1421 for transmitting, circuitry 1422 for receiving, circuitry 1423 for refraining from transmitting, circuitry 1424 for measuring, and/or circuitry 1425 for identifying.

Various components of communications device 1400 may provide means for performing the methods described herein, including with respect to FIGS. 8-11 and 13.

In some examples, means for transmitting or sending (or means for outputting for transmission) may include the transceivers 232 and/or antenna(s) 234 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the base station illustrated in FIG. 2 and/or transceiver 1408 and antenna 1410 of the communication device 1400 in FIG. 14.

In some examples, means for refraining from transmitting, means for measuring, and/or means for identifying may include various processing system components, such as: the one or more processors 1420 in FIG. 14, or aspects of the base station 102 depicted in FIG. 2, including receive processor 238, transmit processor 220, TX MIMO processor 230, and/or controller/processor 240 (including channel grant component 241).

Notably, FIG. 14 is an example, and many other examples and configurations of communication device 1400 are possible.

Figure 15:
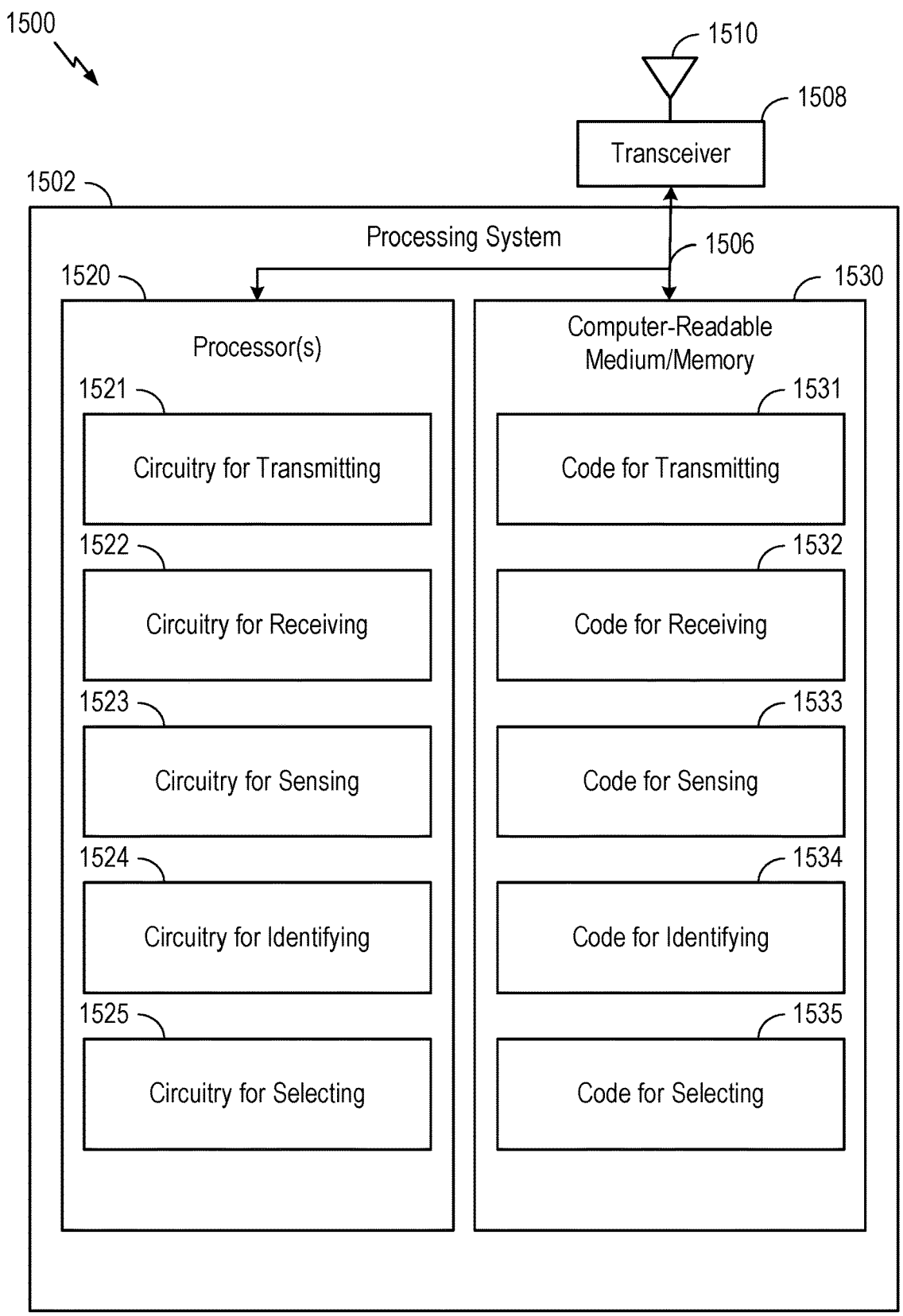
FIG. 15 depicts aspects of an example communications device.

FIG. 15 depicts an example communications device 1500 (e.g., a user equipment) that includes various components operable, configured, or adapted to perform operations for the techniques disclosed herein, such as the operations depicted and described with respect to FIGS. 8-12. In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 8-12, or other operations for performing the various techniques discussed herein for channel access.

In the depicted example, computer-readable medium/memory 1530 stores code 1531 for transmitting, code 1532 for receiving, code 1533 for sensing, code 1534 for identifying, and/or code 1535 for selecting.

In the depicted example, the one or more processors 1520 include circuitry configured to implement the code stored in the computer-readable medium/memory 1530, including circuitry 1521 for transmitting, circuitry 1522 for receiving, circuitry 1523 for sensing, circuitry 1524 for identifying, and/or circuitry 1525 for selecting.

Various components of communications device 1500 may provide means for performing the methods described herein, including with respect to FIGS. 8-12.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the user equipment 104 illustrated in FIG. 2 and/or transceiver 1508 and antenna 1510 of the communication device 1500 in FIG. 15.

In some examples, means for sensing, means for identifying, and/or means for selecting may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including channel access component 281).

Notably, FIG. 15 is an example, and many other examples and configurations of communication device 1500 are possible.

Example Clauses

Implementation examples are described in the following numbered clauses:

Clause 1: A method of wireless communication by a user equipment, comprising: receiving a resource grant indicating a plurality of resource candidates for an uplink signal; sensing for energy, in response to the resource grant, over one or more of the resource candidates in a first sensing occasion before a transmission occasion of the uplink signal; and transmitting, during the transmission occasion, the uplink signal using a subset of the resource candidates selected based at least in part on energy sensed in the first sensing occasion.

Clause 2: The method of Clause 1, further comprising: sensing for energy over the subset of the resource candidates in a second sensing occasion between the first sensing occasion and the transmission occasion of the uplink signal in time; and wherein transmitting the uplink signal comprises transmitting the uplink signal if energy sensed in the second sensing occasion is less than or equal to a threshold.

Clause 3: The method according to any one of Clauses 1 or 2, wherein the subset of the resource candidates is selected based on the subset of the resource candidates having energy sensed in the first sensing occasion that is less than or equal to a threshold.

Clause 4: The method according to any one of Clauses 1-3, further comprising transmitting an indication of the subset of the resource candidates that will be used for transmission of the uplink signal.

Clause 5: The method according to any one of Clauses 1-4, wherein: the resource candidates include a plurality of frequency domain candidates; the transmission occasion of the resource candidates is separated in time from reception of the resource grant by a gap that includes a first preparation time and a second preparation time associated with the uplink signal; and the first sensing occasion occurs before the second preparation time.

Clause 6: The method of Clause 5, further comprising: sensing for energy over the subset of the resource candidates in a second sensing occasion that occurs within the second preparation time; and wherein transmitting the uplink signal comprises transmitting the uplink signal using the subset of the resource candidates selected based on energy sensed in the first sensing occasion and the second sensing occasion.

Clause 7: The method according to any one of Clauses 1-6, wherein: the resource candidates include a plurality of spatial domain candidates; and the first sensing occasion ends with enough time for preparation of a selected spatial domain candidate of the spatial domain candidates based on the sensed energy in the first sensing occasion.

Clause 8: The method according to any one of Clauses 1-7, wherein: the resource candidates include a first time domain candidate and a second time domain candidate; the first sensing occasion occurs in time before the first time domain candidate; and sensing for energy comprises sensing for energy over a first frequency resource associated with the first time domain candidate in the first sensing occasion.

Clause 9: The method of Clause 8, further comprising: identifying that energy sensed over the first frequency resource in the first sensing occasion is greater than or equal to a threshold; and sensing for energy, in response to the identification, over a second frequency resource associated with the second time domain candidate in a second sensing occasion before the second time domain candidate; and wherein transmitting the uplink signal comprises transmitting the uplink signal using the subset of the resource candidates selected based on energy sensed in the first sensing occasion and the second sensing occasion.

Clause 10: The method according to any one of Clauses 1-7, wherein: the first sensing occasion comprises a plurality of sensing occasions within a sensing window; and sensing for energy comprises sensing for energy using a different one of the resource candidates in at least one of the sensing occasions until energy sensed in the corresponding sensing occasion is less than or equal to a threshold.

Clause 11: The method according to any one of Clauses 1-10, wherein the resource grant includes at least one of: a location of the first sensing occasion, a duration of the first sensing occasion, a type associated with the first sensing occasion, a location of a second sensing occasion, a duration of the second sensing occasion, a type associated with the second sensing occasion, or a priority associated with at least one of the resource candidates.

Clause 12: The method according to any one of Clauses 1-11, further comprising: receiving a configuration indicating one or more parameters associated with uplink channel access; and wherein sensing for energy in the first sensing occasion comprises sensing for energy in the first sensing occasion based at least in part on the configuration, and wherein the one or more parameters comprise at least one of: a location of the first sensing occasion, a duration of the first sensing occasion, a type associated with the first sensing occasion, a location of a second sensing occasion, a duration of the second sensing occasion, a type associated with the second sensing occasion, or a priority associated with at least one resource.

Clause 13: The method according to any one of Clauses 1-12, further comprising transmitting uplink capability information including at least one of: a first preparation time for at least encoding and rate matching an uplink payload; a second preparation time for at least resource mapping, scrambling, and generating a time-domain waveform; or a third preparation time for preparing beamforming.

Clause 14: A method of wireless communication by a network entity, comprising: transmitting, to a user equipment (UE), a resource grant indicating a plurality of resource candidates for an uplink signal and a first sensing occasion; refraining from transmitting using resources included in the resource candidates during the first sensing occasion; and receiving, from the UE, the uplink signal using a subset of the resource candidates.

Clause 15: The method of Clause 14, wherein: the resource grant further indicates a second sensing occasion; and refraining from transmitting further comprises refraining from transmitting using the resources included in the resource candidates during the first sensing occasion and the second sensing occasion.

Clause 16: The method according to any one of Clauses 14-15 or 18, further comprising receiving, from the UE before receiving the uplink signal, an indication of the subset of the resource candidates that will be used for transmission of the uplink signal.

Clause 17: The method according to any one of Clauses 14-16 or 18, where receiving the uplink signal comprises: measuring energy in a first symbol in time of the uplink signal over the resource candidates; identifying the subset of the resource candidates based on the energy measured in the first symbol of the uplink signal; and receiving a remaining portion of the uplink signal using the identified subset of the resource candidates.

Clause 18: The method of Clause 15, wherein: the resource candidates include a plurality of frequency domain candidates; a transmission occasion of the resource candidates is separated in time from transmission of the resource grant by a gap that includes a first preparation time and a second preparation time associated with the uplink signal; and the first sensing occasion occurs before the second preparation time.

Clause 19: The method of Clause 18, wherein: the resource grant further indicates a second sensing occasion, which occurs within the second preparation time; and refraining from transmitting further comprises refraining from transmitting using the resources included in the resource candidates during the first sensing occasion and the second sensing occasion.

Clause 20: The method according to any one of Clauses 14-19, further comprising: transmitting, to a plurality of UEs, resource grants indicating a set of resource candidates for each of the UEs, wherein the sets of resource candidates are allocated in separate transmission occasions, which are staggered in time with each other; and receiving signals from at least one of the UEs using the set of resource candidates.

Clause 21: The method according to any of Clauses 14-20, wherein: the resource candidates include a plurality of spatial domain candidates; and the first sensing occasion ends with a preparation time at the UE for the spatial domain candidates.

Clause 22: The method according to any one of Clauses 14-21, wherein the resource candidates include a plurality of time domain candidates that are separated in time from each other by a gap that provides time for the UE to sense for energy using a frequency resource associated with the upcoming time domain candidate.

Clause 23: The method according to any one of Clauses 14-22, wherein the resource grant includes at least one of: a location of the first sensing occasion, a duration of the first sensing occasion, a type associated with the first sensing occasion, a location of a second sensing occasion, a duration of the second sensing occasion, a type associated with the second sensing occasion, or a priority associated with each of the resource candidates.

Clause 24: The method according to any one of Clauses 14-23, further comprising transmitting a configuration, to the UE, indicating one or more parameters associated with uplink channel access wherein the one or more parameters comprise at least one of: a location of a first sensing occasion for the UE to use before transmitting the signal, a duration of the first sensing occasion, a type associated with the first sensing occasion, a location of a second sensing occasion for the UE to use before transmitting the signal, a duration of the second sensing occasion, a type associated with the second sensing occasion, or a priority associated with at least one resource.

Clause 25: The method according to any one of Clauses 14-24, further comprising: receiving, from the UE, uplink capability information including at least one of a first preparation time for at least encoding and rate matching an uplink payload; a second preparation time for at least resource mapping, scrambling, and generating a time-domain waveform; or a third preparation time for preparing beamforming; and wherein the resource grant is based on the uplink capability information.

Clause 26: An apparatus for wireless communication, comprising: a memory; and a processor coupled to the memory, the processor and the memory being configured to: receive a resource grant indicating a plurality of resource candidates for an uplink signal; sense for energy, in response to the resource grant, over one or more of the resource candidates in a first sensing occasion before a transmission occasion of the uplink signal; and transmit, during the transmission occasion, the uplink signal using a subset of the resource candidates selected based at least in part on energy sensed in the first sensing occasion.

Clause 27: The apparatus of Clause 26, wherein the processor and the memory are further configured to: sense for energy over the subset of the resource candidates in a second sensing occasion between the first sensing occasion and the transmission occasion of the uplink signal in time; and transmit the uplink signal if energy sensed in the second sensing occasion is less than or equal to a threshold.

Clause 28: The apparatus of Clause 26, wherein the processor and the memory are further configured to select the subset of the resource candidates based on the subset of the resources having energy sensed in the first sensing occasion that is less than or equal to a threshold.

Clause 29: A non-transitory computer-readable medium storing code that, when executed by one or more processors of an apparatus, cause the apparatus to perform a method, the method comprising: receiving a resource grant indicating a plurality of resource candidates for an uplink signal; sensing for energy, in response to the resource grant, over one or more of the resource candidates in a first sensing occasion before a transmission occasion of the uplink signal; and transmitting, during the transmission occasion, the uplink signal using a subset of the resource candidates selected based at least in part on energy sensed in the first sensing occasion.

Clause 30: The computer-readable medium of Clause 29, wherein the method comprises: sensing for energy over the subset of the resource candidates in a second sensing occasion between the first sensing occasion and the transmission occasion of the uplink signal in time; and wherein transmitting the uplink signal comprises transmitting the uplink signal if energy sensed in the second sensing occasion is less than or equal to a threshold.

Clause 31: An apparatus, comprising: a memory comprising executable instructions; one or more processors configured to execute the executable instructions and cause the apparatus to perform a method in accordance with any one of Clauses 1-25.

Clause 32: An apparatus, comprising means for performing a method in accordance with any one of Clauses 1-25.

Clause 33: A non-transitory computer-readable medium comprising executable instructions that, when executed by one or more processors of an apparatus, cause the apparatus to perform a method in accordance with any one of Clauses 1-25.

Clause 34: A computer program product embodied on a computer-readable storage medium comprising code for performing a method in accordance with any one of Clauses 1-25.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (xcomponent carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (S1VIF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of channel access in communication systems, for example, in an unlicensed spectrum. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
a memory comprising executable instructions; and
one or more processors configured to execute the instructions and cause the UE to:
receive a resource grant indicating a plurality of resource candidates for an uplink signal;
sense for energy, in response to the resource grant, over one or more of the plurality of resource candidates in a first sensing occasion before a transmission occasion of the uplink signal;
sense, in a second sensing occasion between the first sensing occasion and the transmission occasion, for energy over a subset of the plurality of resource candidates selected based at least in part on energy sensed in the first sensing occasion, wherein the subset of the plurality of resource candidates are less than the plurality of resource candidates; and
transmit, during the transmission occasion, the uplink signal using the subset of the plurality of resource candidates when energy sensed in the second sensing occasion is less than or equal to a threshold.

2. The UE of claim 1, wherein the subset of the plurality of resource candidates has energy sensed in the first sensing occasion that is less than or equal to the threshold.

3. The UE of claim 1, wherein the one or more processors are configured to execute the instructions and cause the UE to transmit an indication of the subset of the plurality of resource candidates that will be used for transmission of the uplink signal.

4. The UE of claim 1, wherein:
the plurality of resource candidates include a plurality of frequency domain candidates;
the transmission occasion of the plurality of resource candidates is separated in time from reception of the resource grant by a gap that includes a first preparation time and a second preparation time associated with the uplink signal; and
the first sensing occasion occurs before the second preparation time.

5. The UE of claim 4, wherein the one or more processors are configured to execute the instructions and cause the UE to:
sense for energy over the subset of the plurality of resource candidates in the second sensing occasion that occurs within the second preparation time; and
transmit the uplink signal using the subset of the plurality of resource candidates selected based on energy sensed in the first sensing occasion and the second sensing occasion.

6. The UE of claim 1, wherein:
the plurality of resource candidates includes a plurality of spatial domain candidates; and
the first sensing occasion ends with enough time for preparation of a selected spatial domain candidate of the spatial domain candidates based on the sensed energy in the first sensing occasion.

7. The UE of claim 1, wherein:
the plurality of resource candidates includes a first time domain candidate and a second time domain candidate;
the first sensing occasion occurs in time before the first time domain candidate; and
the one or more processors are configured to execute the instructions and cause the UE to sense for energy over a first frequency resource associated with the first time domain candidate in the first sensing occasion.

8. The UE of claim 7, wherein the one or more processors are configured to execute the instructions and cause the UE to:
identify that energy sensed over the first frequency resource in the first sensing occasion is greater than or equal to the threshold; and
sense for energy, in response to the identification, over a second frequency resource associated with the second time domain candidate in a second sensing occasion before the second time domain candidate; and
transmit the uplink signal using the subset of the plurality of resource candidates selected based on energy sensed in the first sensing occasion and the second sensing occasion.

9. The UE of claim 1, wherein:
the first sensing occasion comprises a plurality of sensing occasions within a sensing window; and
the one or more processors are configured to execute the instructions and cause the UE to sense for energy using a different one of the plurality of resource candidates in at least one of the sensing occasions until energy sensed in the corresponding sensing occasion is less than or equal to the threshold.

10. The UE of claim 1, wherein the resource grant includes at least one of:
a location of the first sensing occasion,
a duration of the first sensing occasion,
a type associated with the first sensing occasion,
a location of a second sensing occasion,
a duration of the second sensing occasion,
a type associated with the second sensing occasion, or
a priority associated with at least one of the resource candidates.

11. The UE of claim 1, wherein the one or more processors are configured to execute the instructions and cause the UE to:
receive a configuration indicating one or more parameters associated with uplink channel access; and
sense for energy in the first sensing occasion based at least in part on the configuration, and
wherein the one or more parameters comprise at least one of:
a location of the first sensing occasion,
a duration of the first sensing occasion,
a type associated with the first sensing occasion,
a location of a second sensing occasion,
a duration of the second sensing occasion,
a type associated with the second sensing occasion, or
a priority associated with at least one resource.

12. The UE of claim 1, wherein the one or more processors are configured to execute the instructions and cause the UE to transmit uplink capability information including at least one of:
a first preparation time for at least encoding and rate matching an uplink payload;
a second preparation time for at least resource mapping, scrambling, and generating a time-domain waveform; or
a third preparation time for preparing beamforming.

13. A network entity, comprising:
a memory comprising executable instructions; and
one or more processors configured to execute the instructions and cause the network entity to:
transmit, to a user equipment (UE), a resource grant indicating a plurality of resource candidates for an uplink signal, a transmission occasion, a first sensing occasion before the transmission occasion, and a second sensing occasion between the first sensing occasion and the transmission occasion;
refrain from transmitting using resources included in the plurality of resource candidates during the first sensing occasion; and
receive, from the UE, during the transmission occasion, the uplink signal using a subset of the plurality of resource candidates when energy sensed over the subset of the plurality of resource candidates in the second sensing occasion is less than or equal to a threshold, wherein the subset of the plurality of resource candidates are selected based at least in part on energy sensed in the first sensing occasion, and wherein the subset of the plurality of resource candidates are less than the plurality of resource candidates.

14. The network entity of claim 13, wherein:
the one or more processors are configured to execute the instructions and cause the network entity to refrain from transmitting using the resources included in the plurality of resource candidates during the first sensing occasion and the second sensing occasion.

15. The network entity of claim 13, wherein the one or more processors are configured to execute the instructions and cause the network entity to receive, from the UE before receiving the uplink signal, an indication of the subset of the plurality of resource candidates that will be used for transmission of the uplink signal.

16. The network entity of claim 13, wherein the one or more processors are configured to execute the instructions and cause the network entity to:
measure energy in a first symbol in time of the uplink signal over the plurality of resource candidates;
identify the subset of the plurality of resource candidates based on the energy measured in the first symbol of the uplink signal; and
receive a remaining portion of the uplink signal using the identified subset of the plurality of resource candidates.

17. The network entity of claim 14, wherein:
the plurality of resource candidates include a plurality of frequency domain candidates;
a transmission occasion of the plurality of resource candidates is separated in time from transmission of the resource grant by a gap that includes a first preparation time and a second preparation time associated with the uplink signal; and
the first sensing occasion occurs before the second preparation time.

18. The network entity of claim 17, wherein:
the a second sensing occasion, which occurs within the second preparation time; and
the one or more processors are configured to execute the instructions and cause the network entity to refrain from transmitting using the resources included in the plurality of resource candidates during the first sensing occasion and the second sensing occasion.

19. The network entity of claim 13, wherein the one or more processors are configured to execute the instructions and cause the network entity to:
  transmit, to a plurality of UEs, resource grants indicating a set of resource candidates for each of the UEs, wherein the sets of resource candidates are allocated in separate transmission occasions, which are staggered in time with each other; and
  receive signals from at least one of the UEs using the set of resource candidates.

20. The network entity of claim 13, wherein:
  the plurality of resource candidates include a plurality of spatial domain candidates; and
  the first sensing occasion ends with a preparation time at the UE for the spatial domain candidates.

21. The network entity of claim 13, wherein the plurality of resource candidates include a plurality of time domain candidates that are separated in time from each other by a gap that provides time for the UE to sense for energy using a frequency resource associated with the upcoming time domain candidate.

22. The network entity of claim 13, wherein the resource grant includes at least one of:
  a location of the first sensing occasion,
  a duration of the first sensing occasion,
  a type associated with the first sensing occasion,
  a location of a second sensing occasion,
  a duration of the second sensing occasion,
  a type associated with the second sensing occasion, or
  a priority associated with each of the resource candidates.

23. The network entity of claim 13, wherein the one or more processors are configured to execute the instructions and cause the network entity to transmit a configuration, to the UE, indicating one or more parameters associated with uplink channel access wherein the one or more parameters comprise at least one of:
  a location of a first sensing occasion for the UE to use before transmitting the signal,
  a duration of the first sensing occasion,
  a type associated with the first sensing occasion,
  a location of a second sensing occasion for the UE to use before transmitting the signal,
  a duration of the second sensing occasion,
  a type associated with the second sensing occasion, or
  a priority associated with at least one resource.

24. The network entity of claim 13, wherein the one or more processors are configured to execute the instructions and cause the network entity to:
  receive, from the UE, uplink capability information including at least one of a first preparation time for at least encoding and rate matching an uplink payload; a second preparation time for at least resource mapping, scrambling, and generating a time-domain waveform; or a third preparation time for preparing beamforming; and
  wherein the resource grant is based on the uplink capability information.

25. A method for wireless communication at a user equipment (UE), comprising:
  receiving a resource grant indicating a plurality of resource candidates for an uplink signal,
  sensing for energy, in response to the resource grant, over one or more of the plurality of resource candidates in a first sensing occasion before a transmission occasion of the uplink signal,
  sensing, in a second sensing occasion between the first sensing occasion and the transmission occasion, for energy over a subset of the plurality of resource candidates selected based at least in part on energy sensed in the first sensing occasion, wherein the subset of the plurality of resource candidates are less than the plurality of resource candidates, and
  transmitting, during the transmission occasion, the uplink signal using the subset of the plurality of resource candidates when energy sensed in the second sensing occasion is less than or equal to a threshold.

26. The method of claim 25, further comprising selecting the subset of the plurality of resource candidates having energy sensed in the first sensing occasion that is less than or equal to the threshold.

27. A method for wireless communication at a network entity, comprising:
  transmitting, to a user equipment (UE), a resource grant indicating a plurality of resource candidates for an uplink signal, a transmission occasion, a first sensing occasion before the transmission occasion, and a second sensing occasion between the first sensing occasion and the transmission occasion;
  refraining from transmitting using resources included in the plurality of resource candidates during the first sensing occasion; and
  receiving, from the UE, during the transmission occasion, the uplink signal using a subset of the plurality of resource candidates when energy sensed over the subset of the plurality of resource candidates in the second sensing occasion is less than or equal to a threshold, wherein the subset of the plurality of resource candidates are selected based at least in part on energy sensed in the first sensing occasion, and wherein the subset of the plurality of resource candidates are less than the plurality of resource candidates.

* * * * *